July 23, 1935.  E. P. BURRELL  2,009,354
MACHINE TOOL
Filed May 12, 1932  19 Sheets-Sheet 3
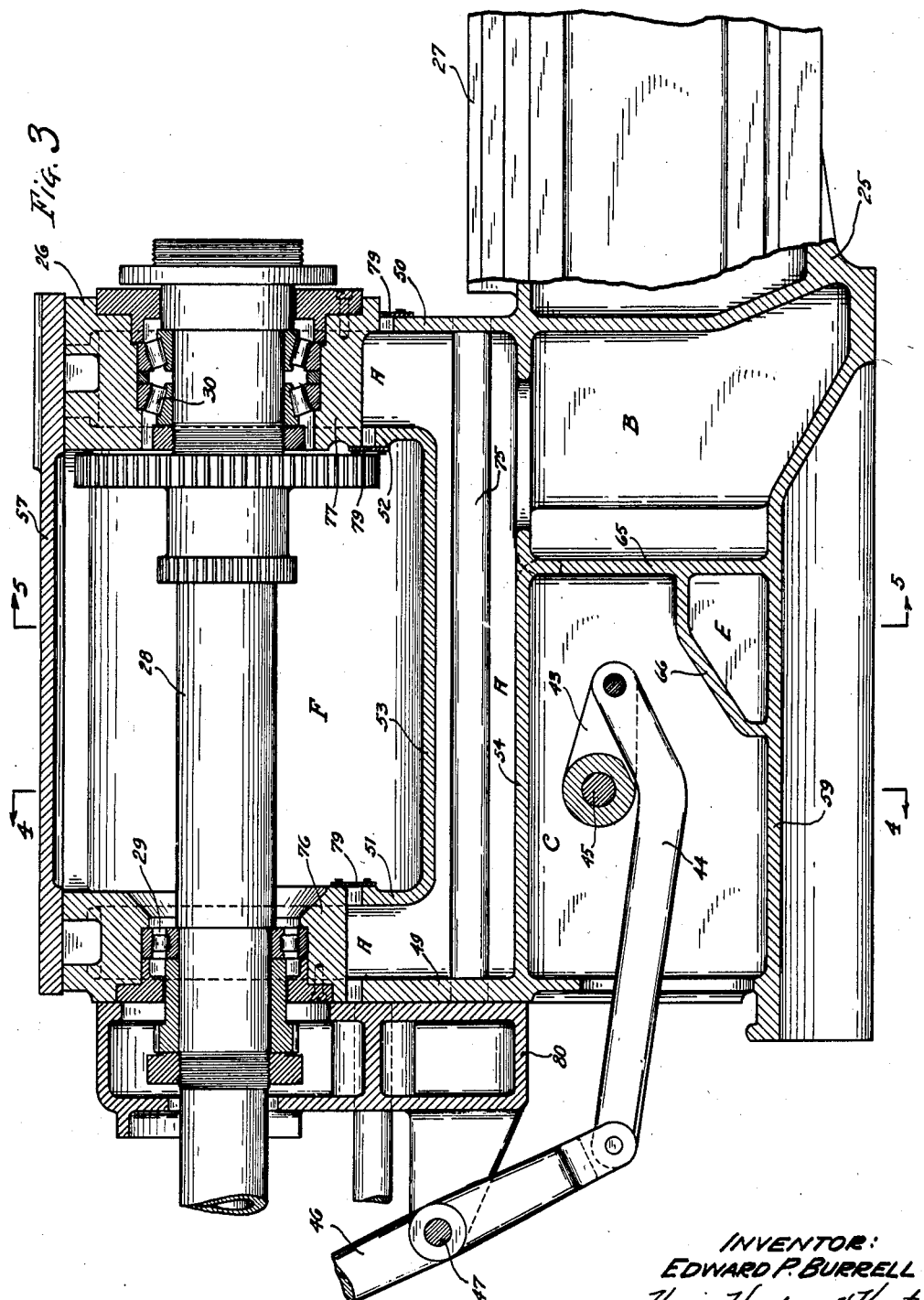
INVENTOR:
EDWARD P. BURRELL
ATTORNEYS

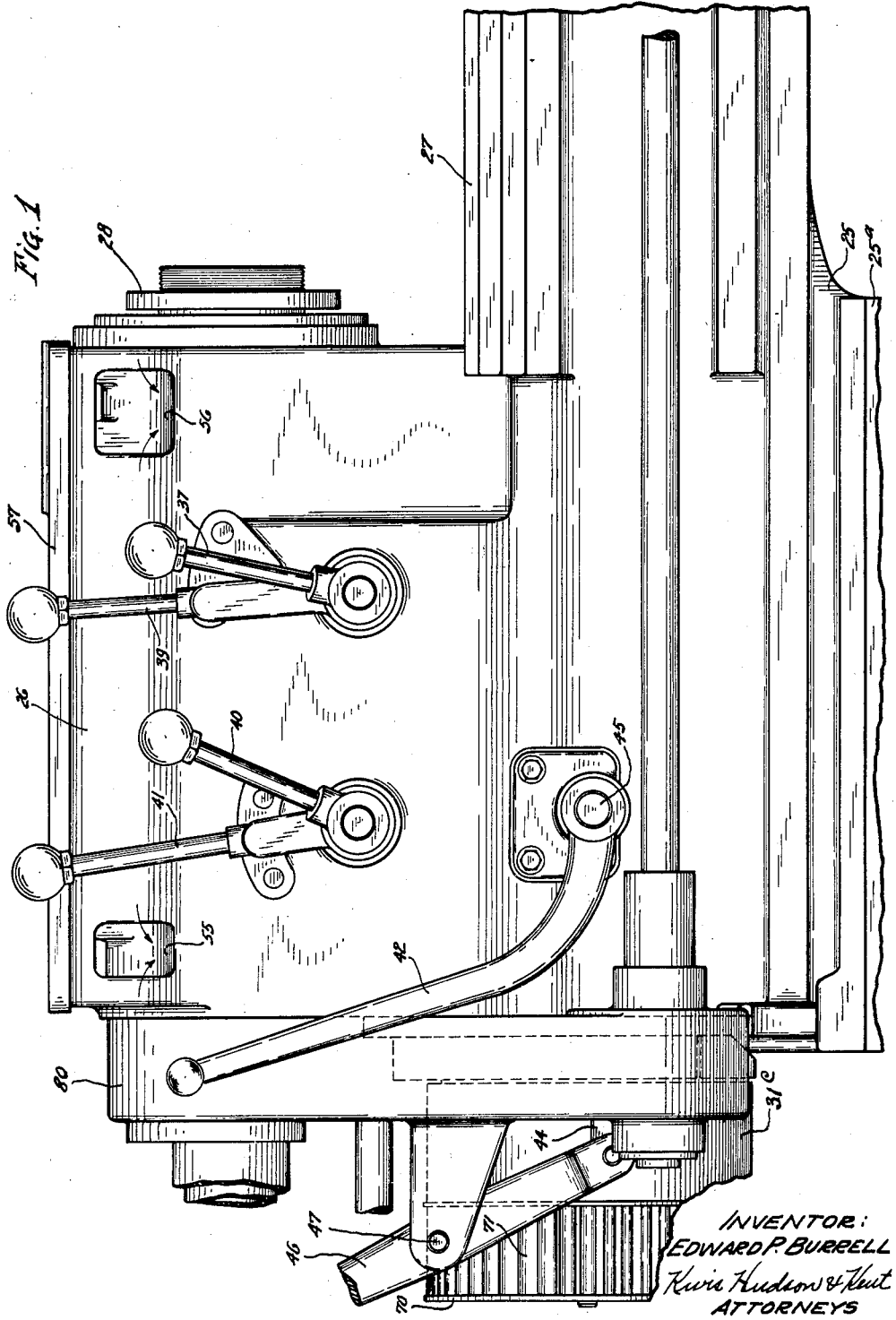

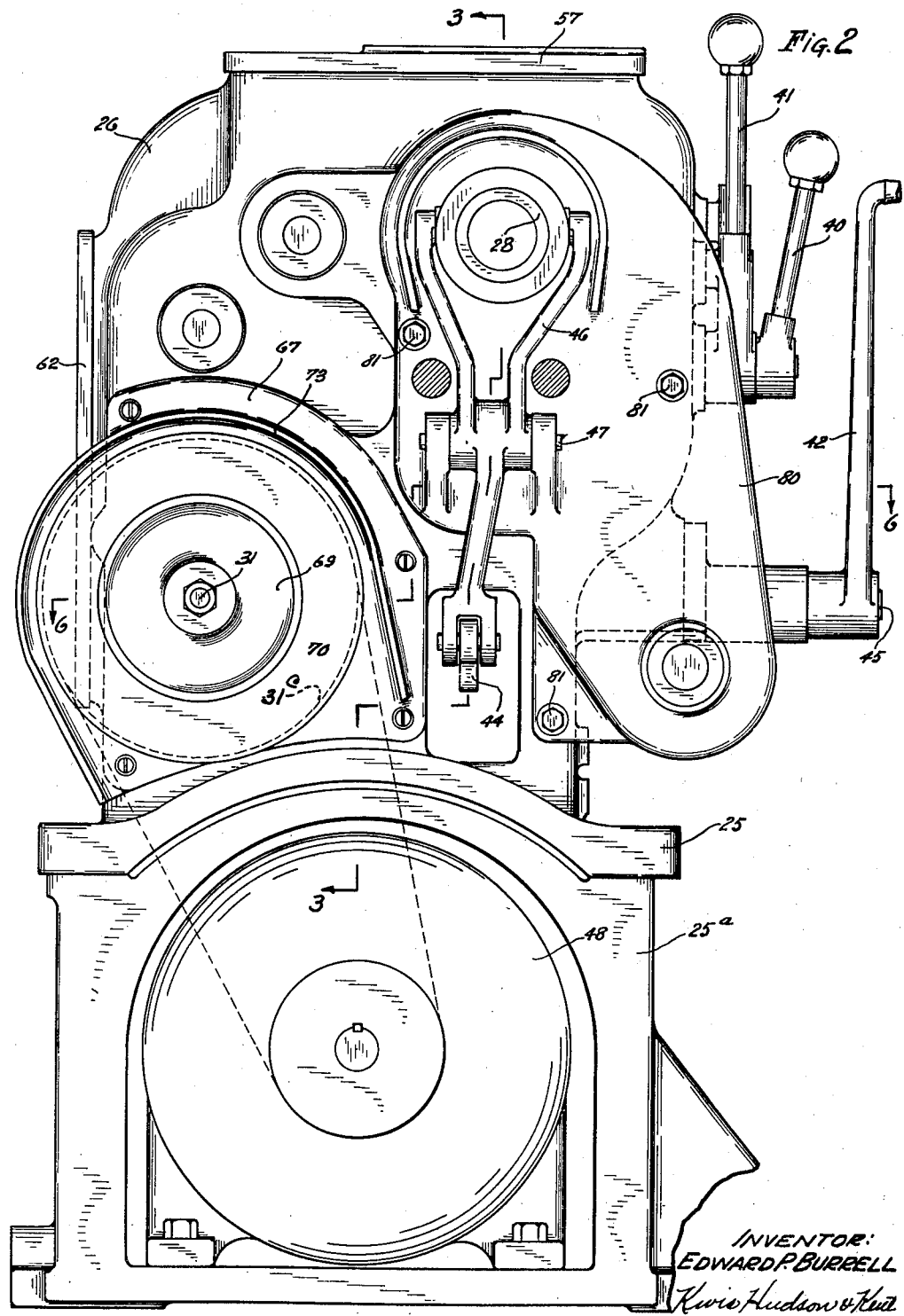

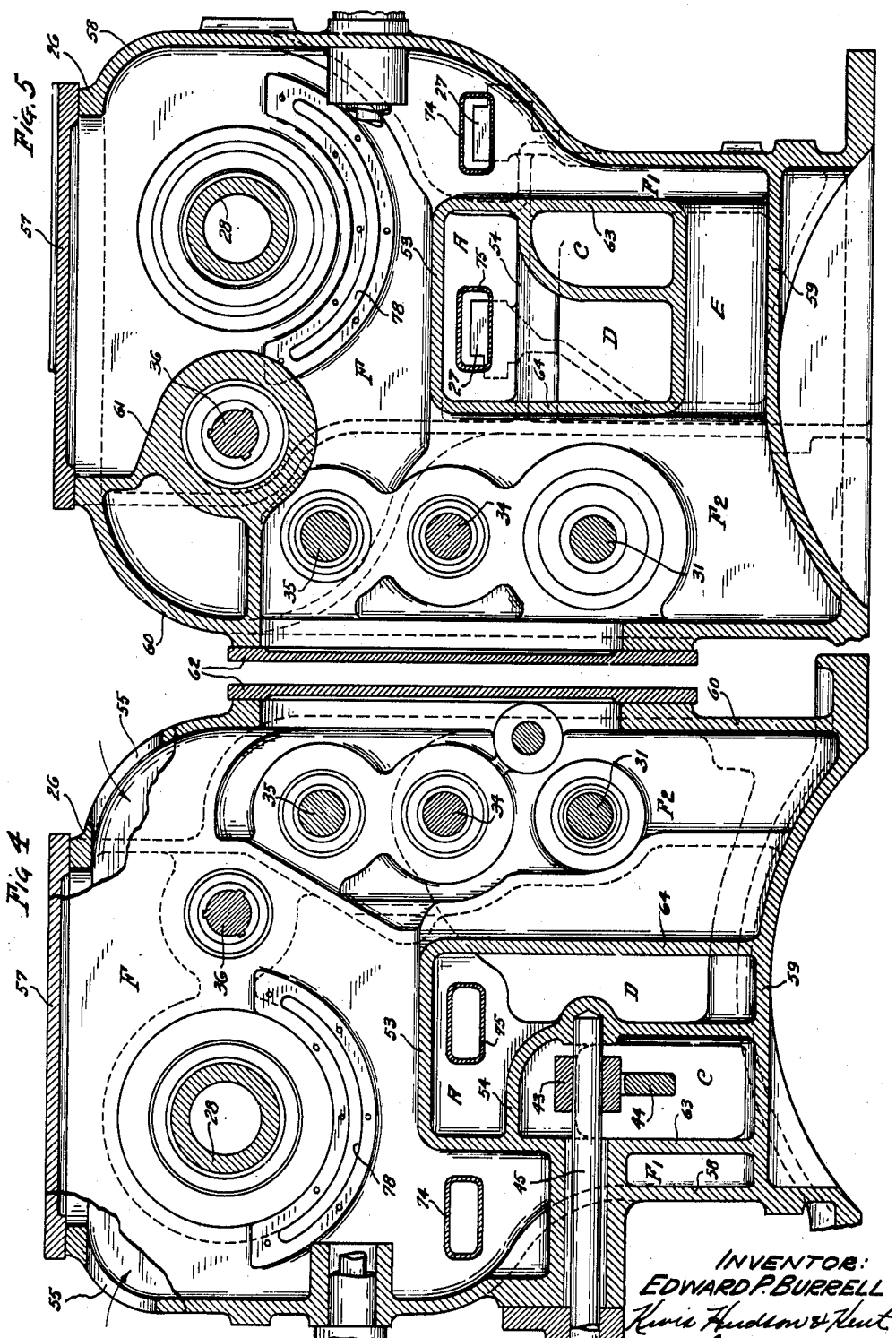

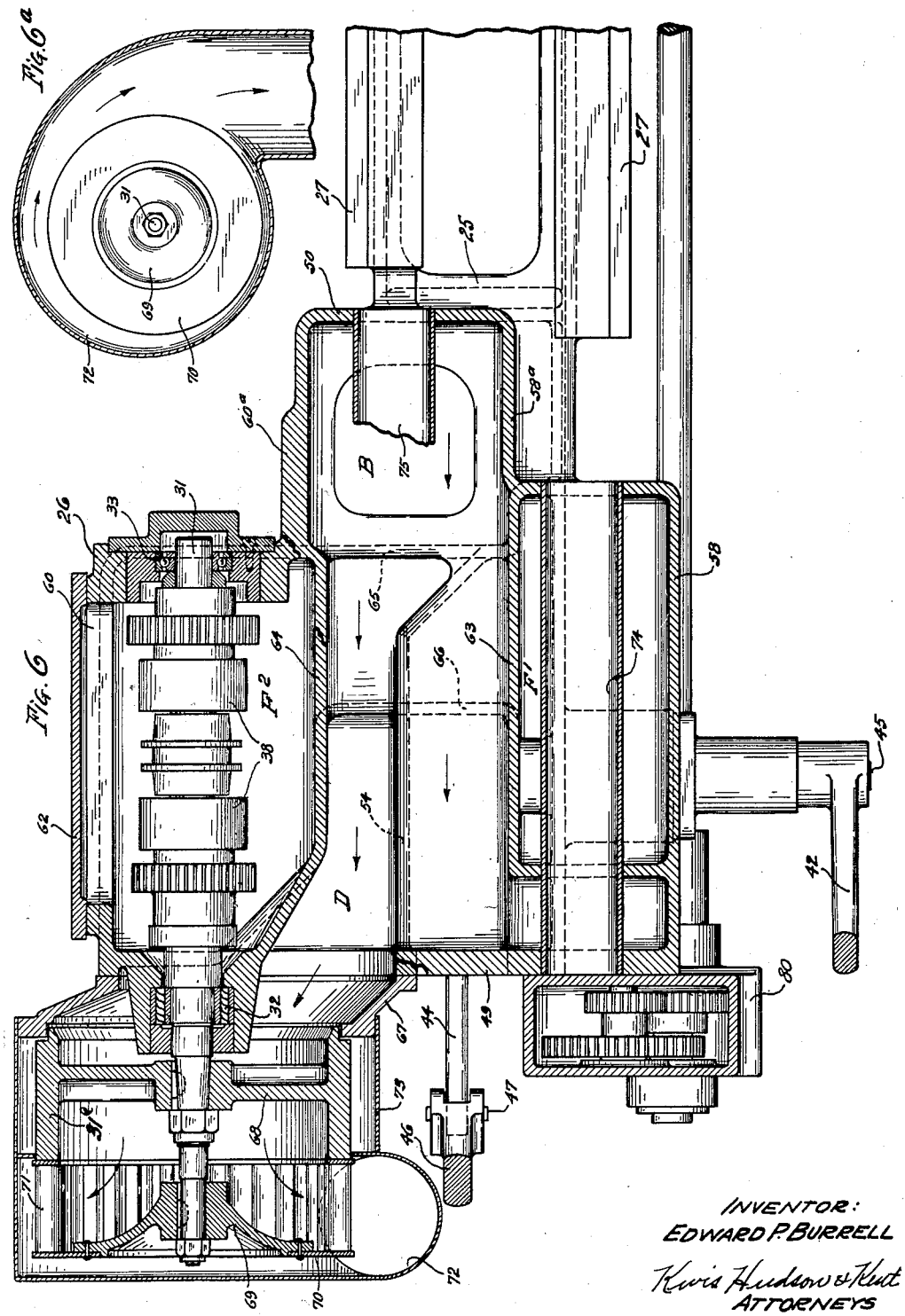

July 23, 1935.  E. P. BURRELL  2,009,354
MACHINE TOOL
Filed May 12, 1932  19 Sheets-Sheet 6
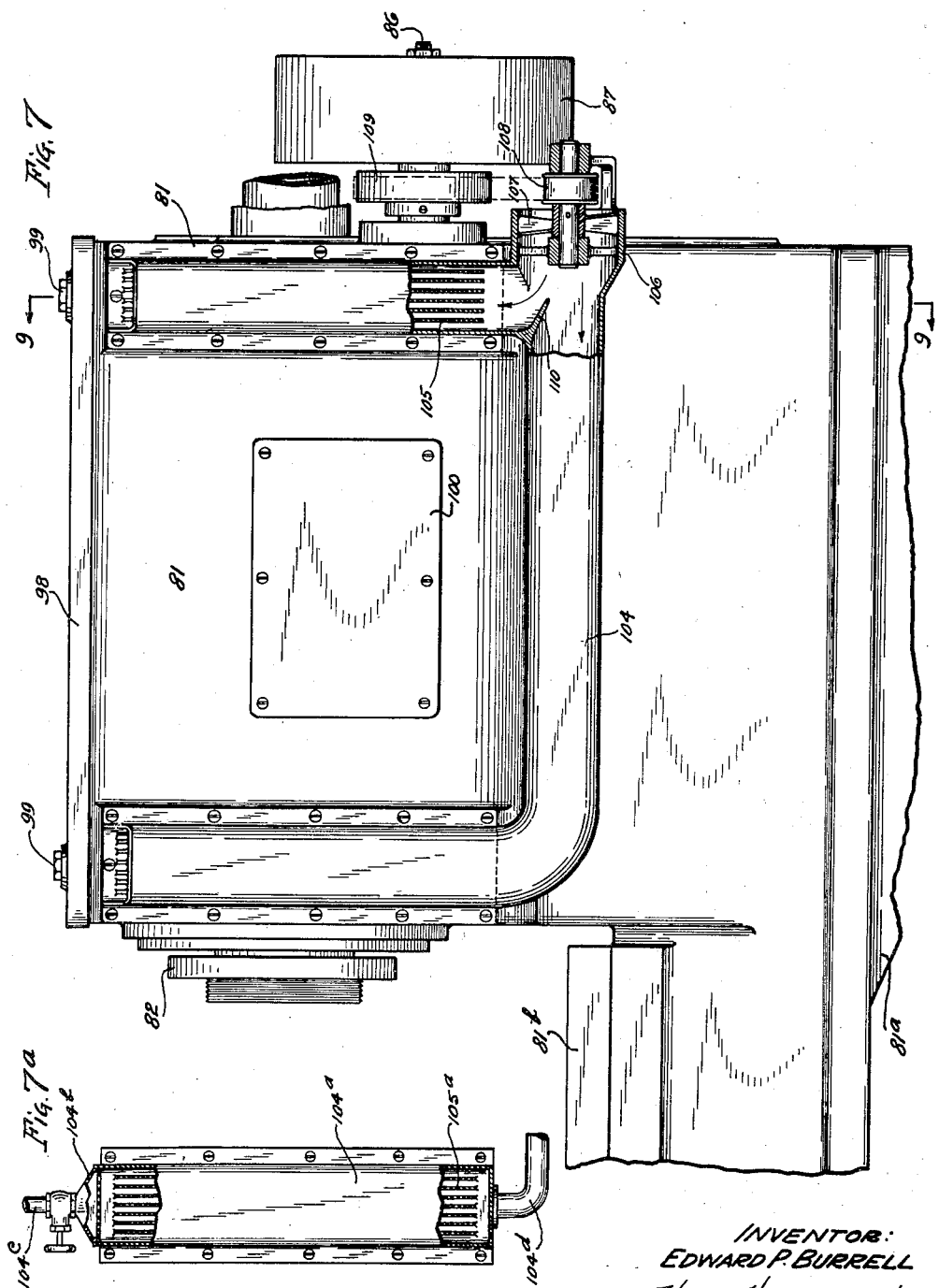
INVENTOR:
EDWARD P. BURRELL
Kwis Hudson & Kent
ATTORNEYS

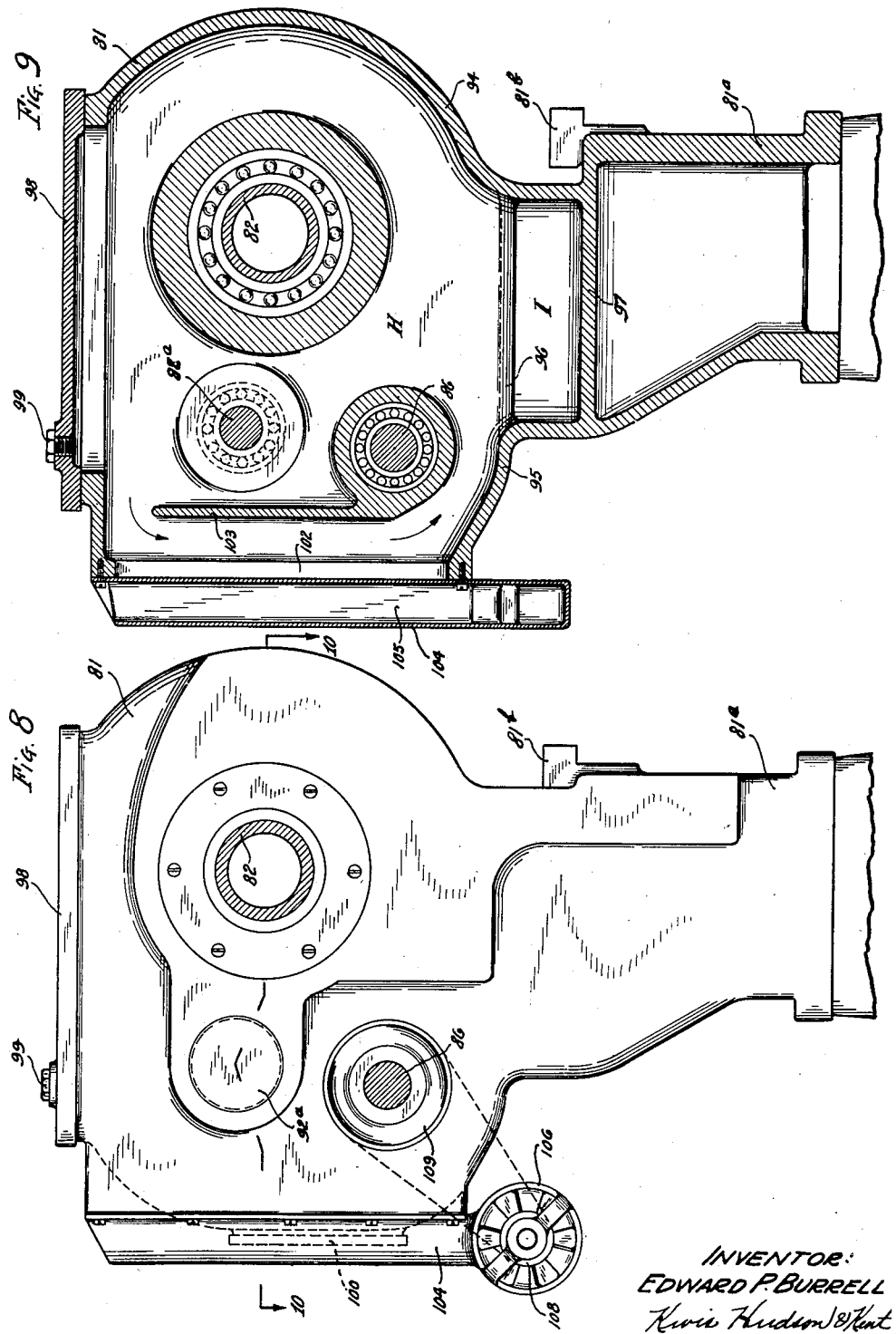

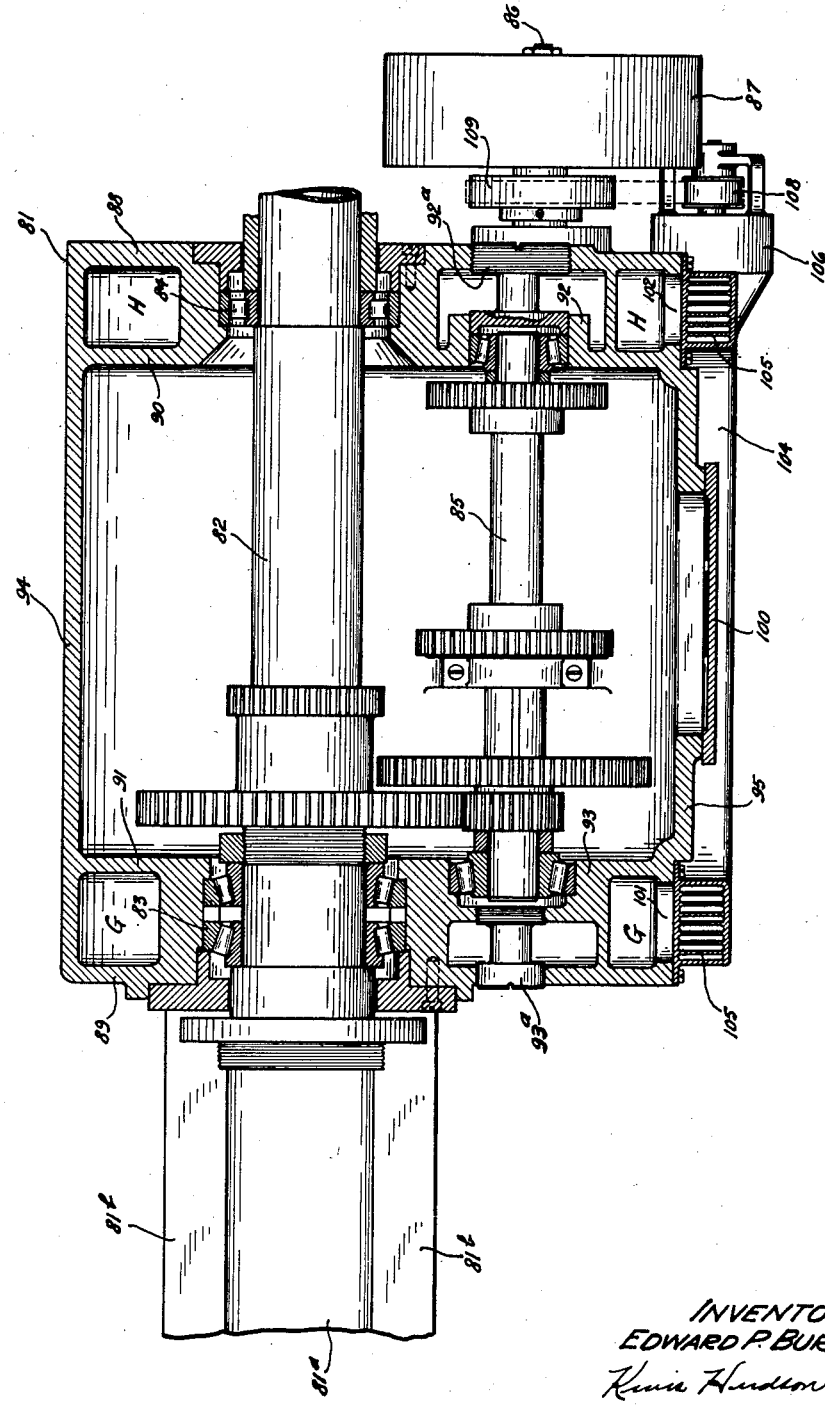

July 23, 1935.　　　E. P. BURRELL　　　2,009,354
MACHINE TOOL
Filed May 12, 1932　　　19 Sheets-Sheet 9
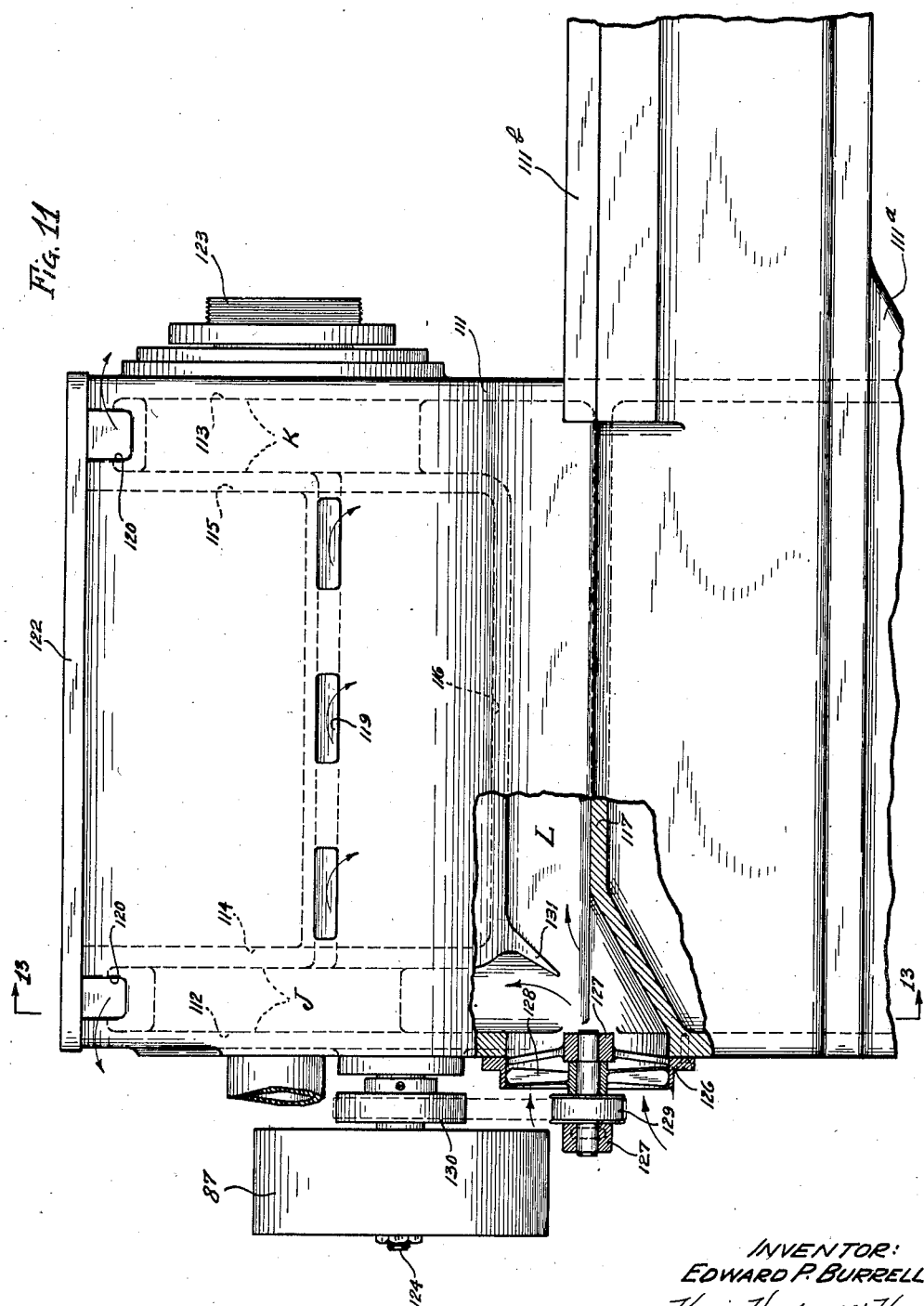
INVENTOR:
EDWARD P. BURRELL
Kwin Hudson & Kent
ATTORNEYS

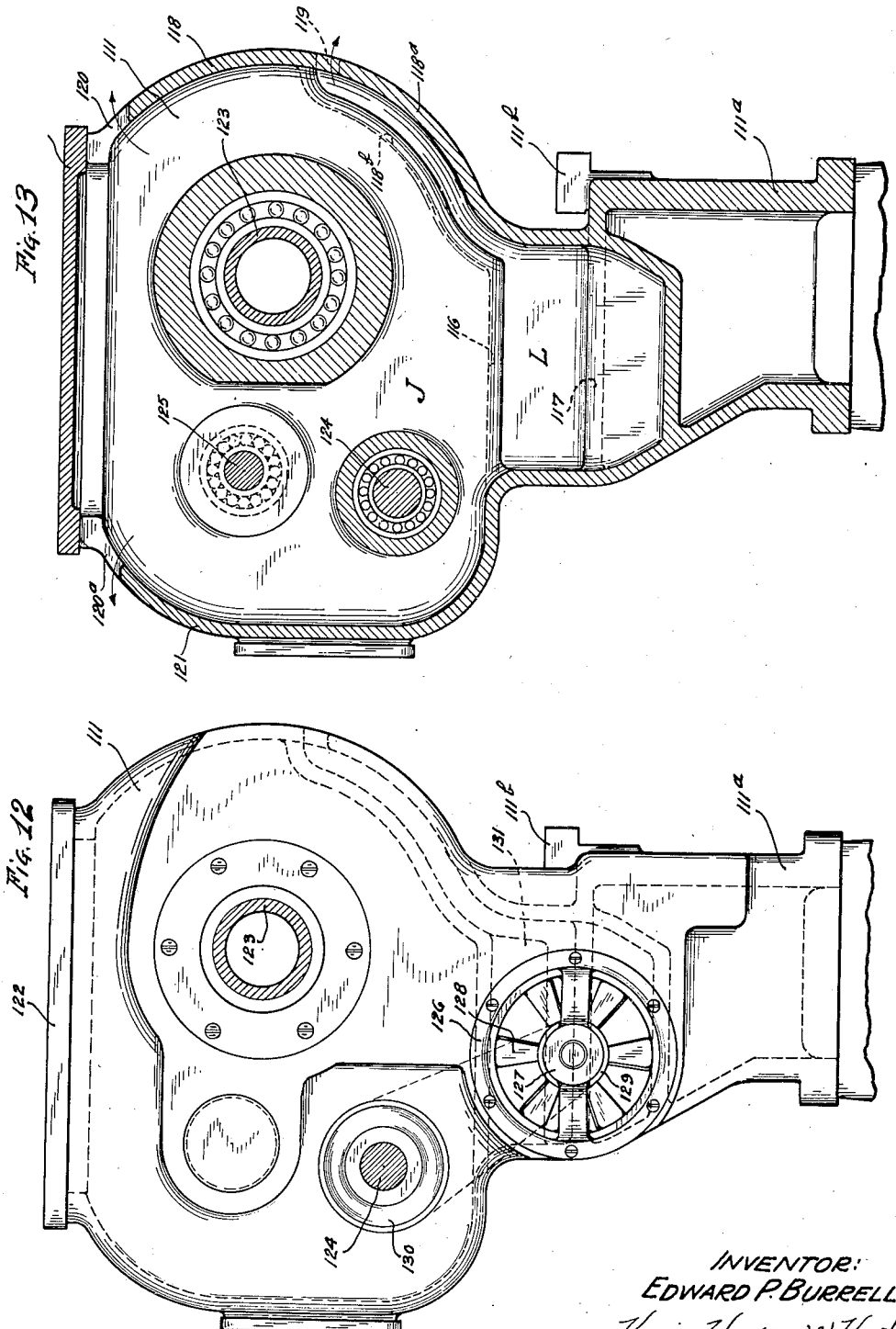

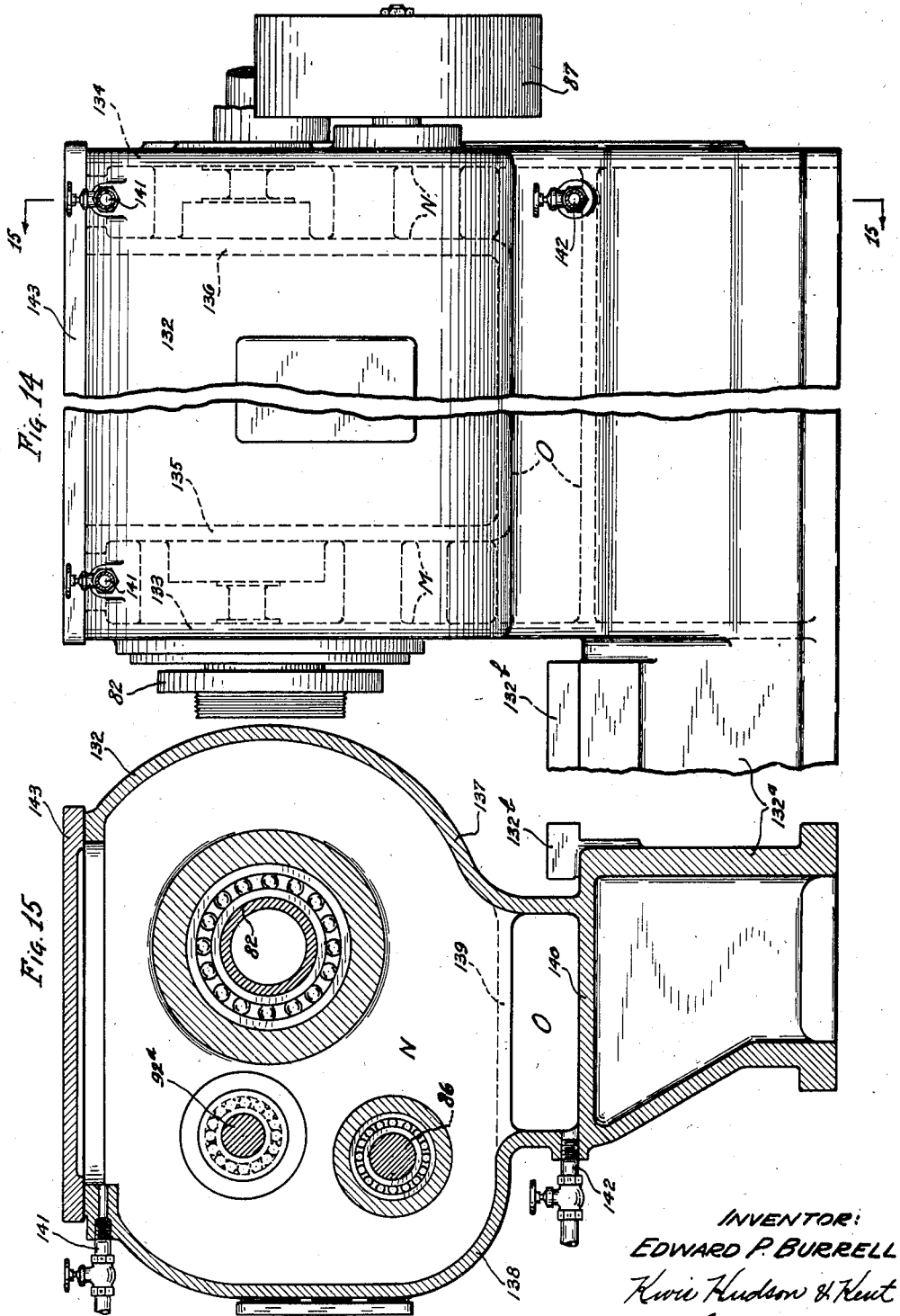

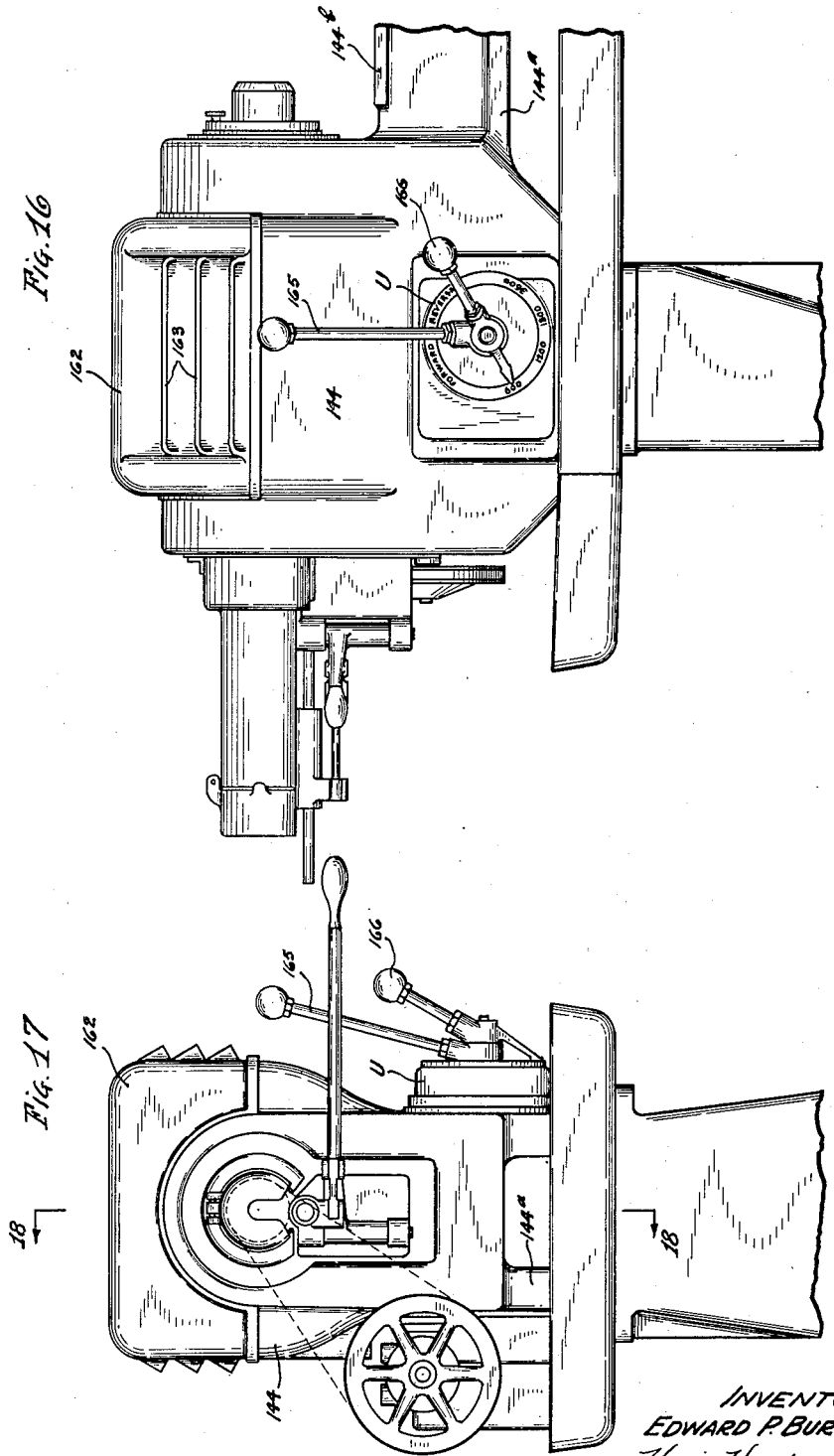

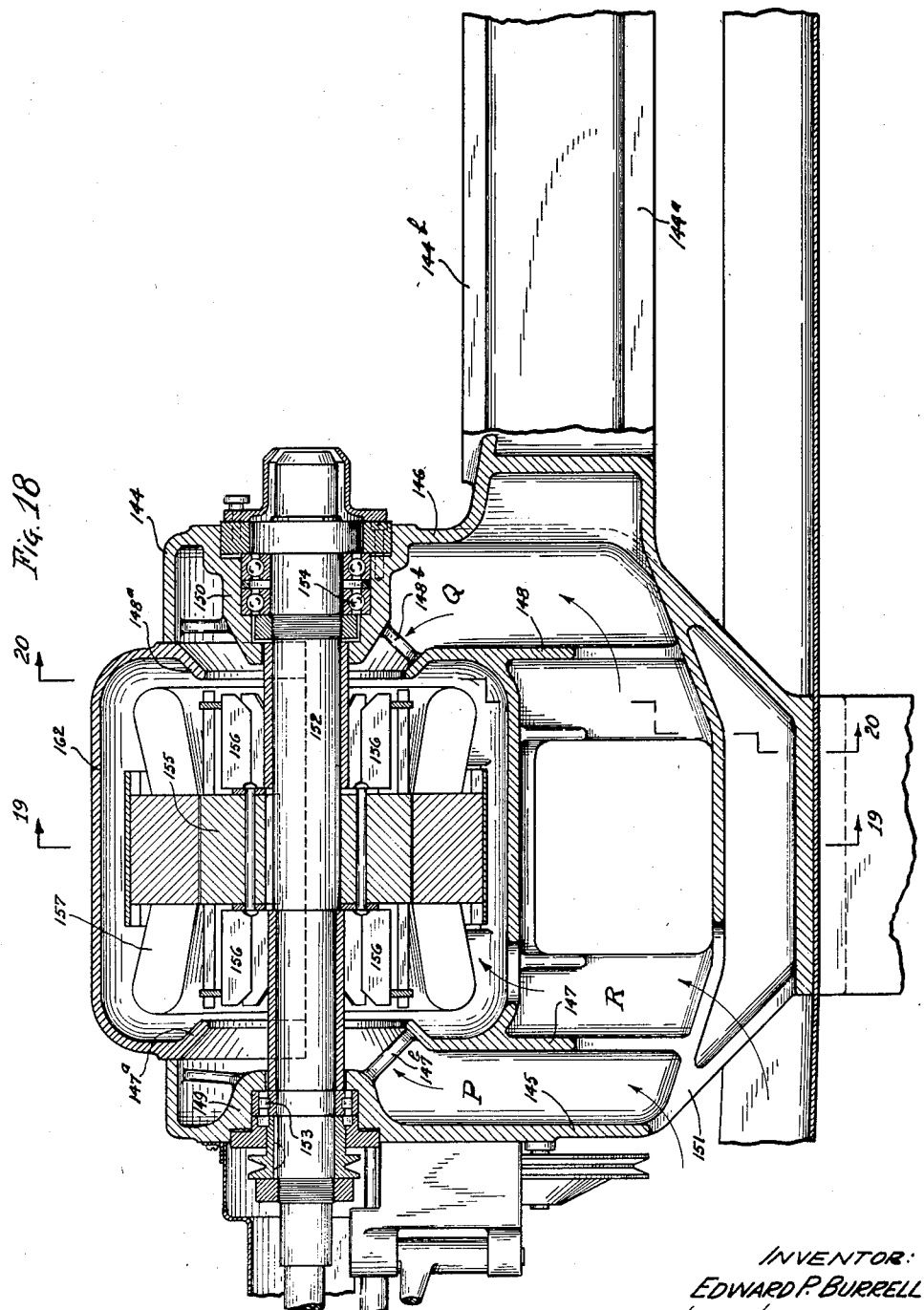

July 23, 1935.  E. P. BURRELL  2,009,354
MACHINE TOOL
Filed May 12, 1932   19 Sheets-Sheet 14
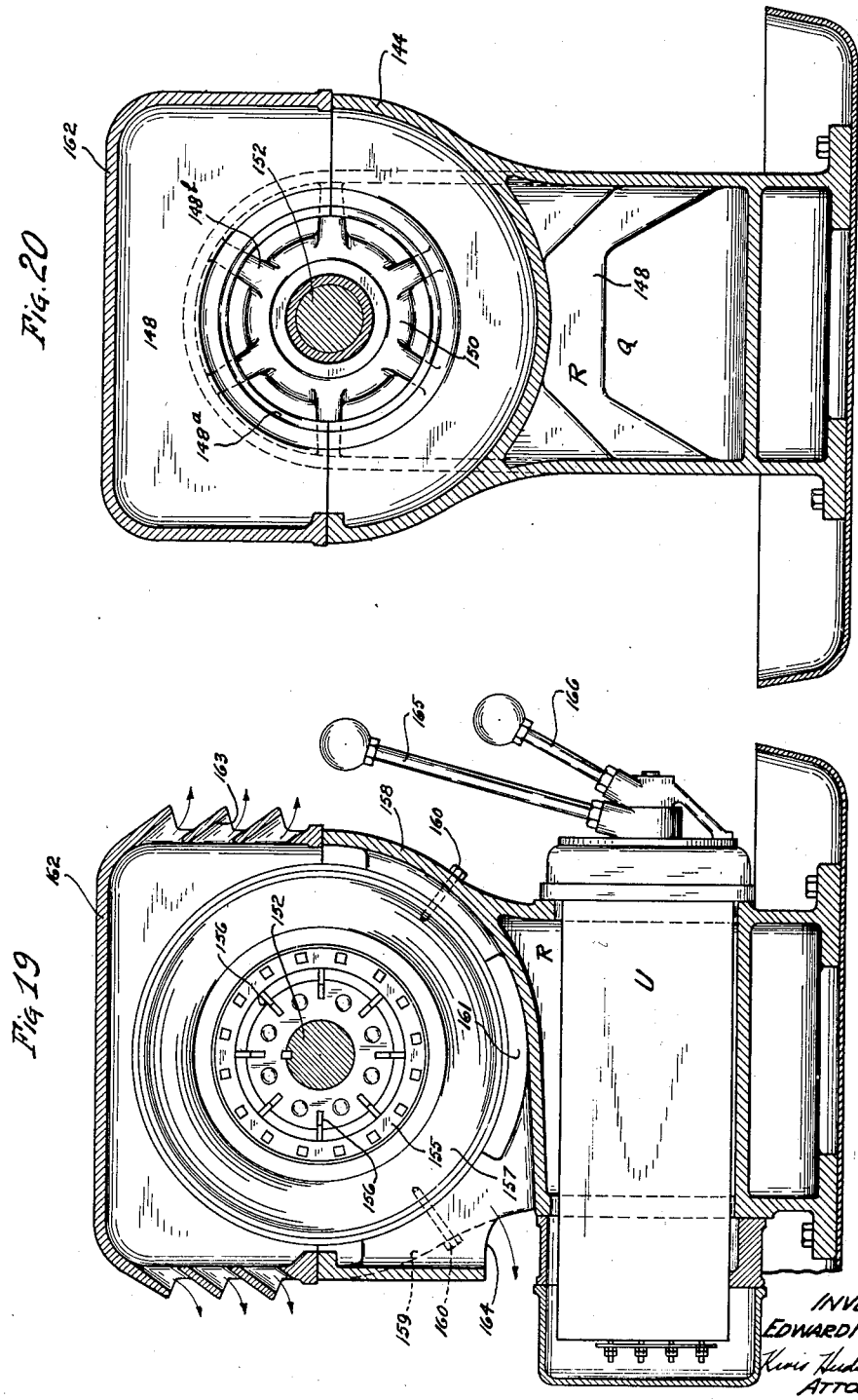
INVENTOR:
EDWARD P. BURRELL
ATTORNEYS July 23, 1935.  E. P. BURRELL  2,009,354
MACHINE TOOL
Filed May 12, 1932   19 Sheets-Sheet 15
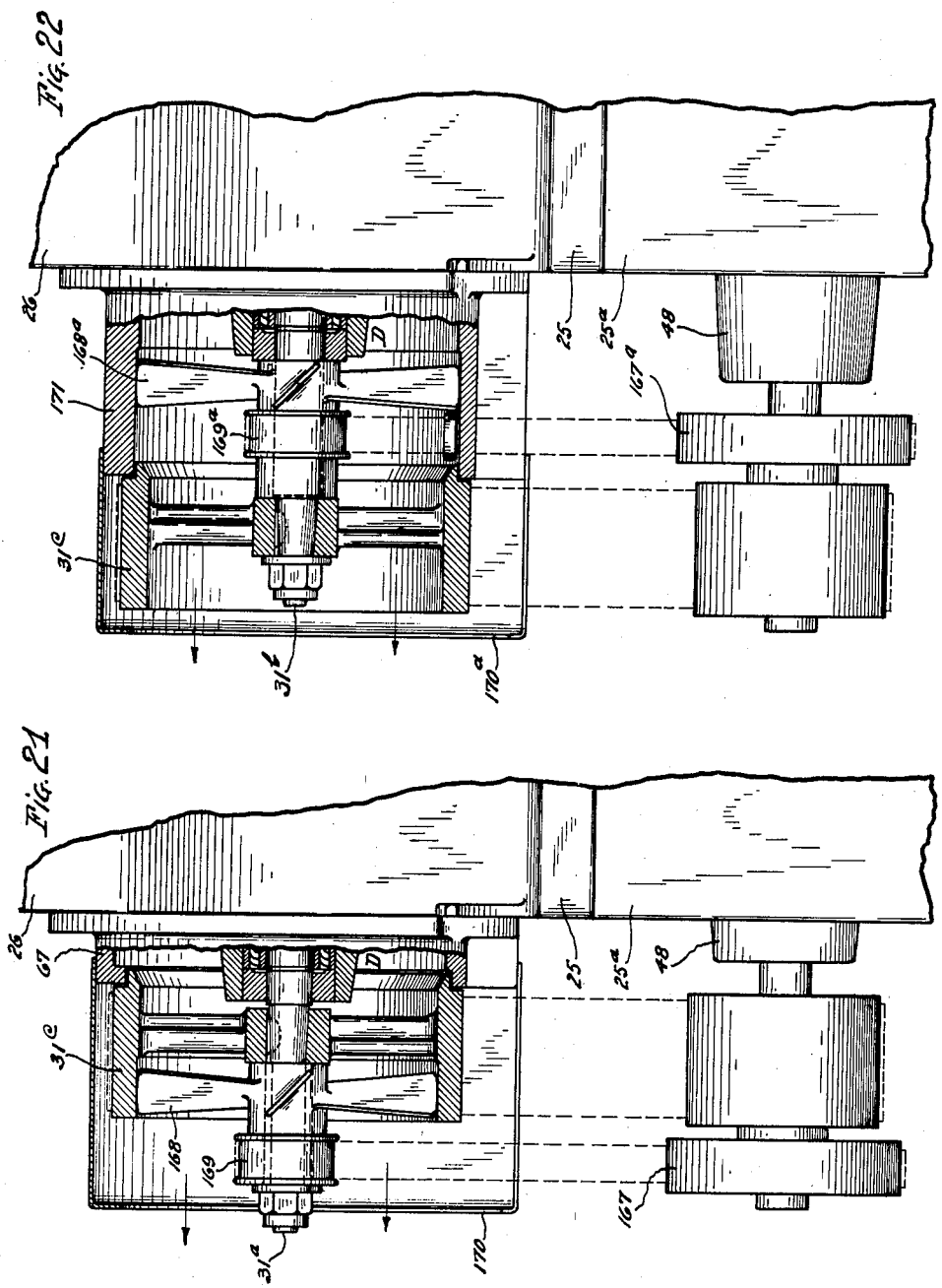
INVENTOR:
EDWARD P. BURRELL
ATTORNEYS

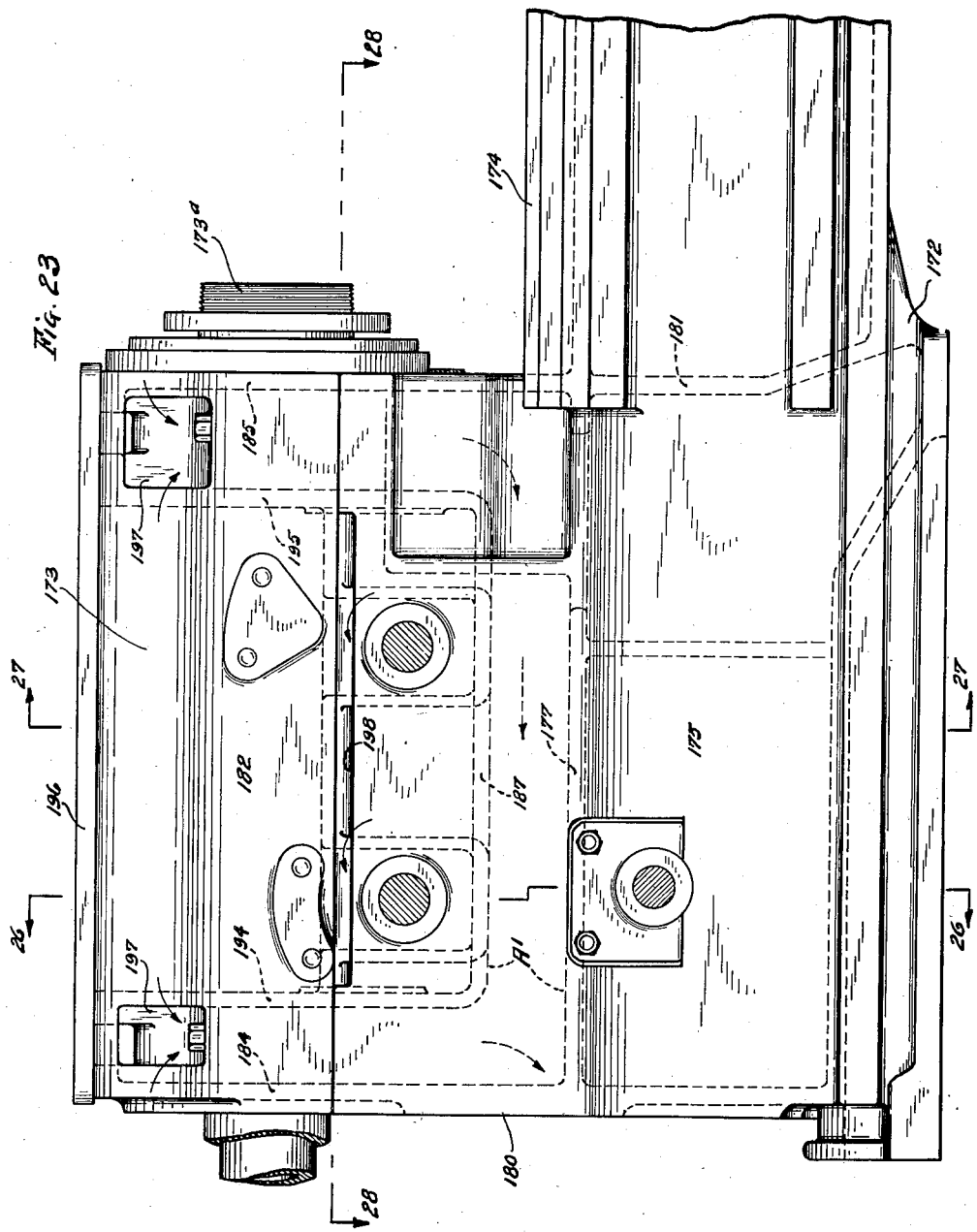

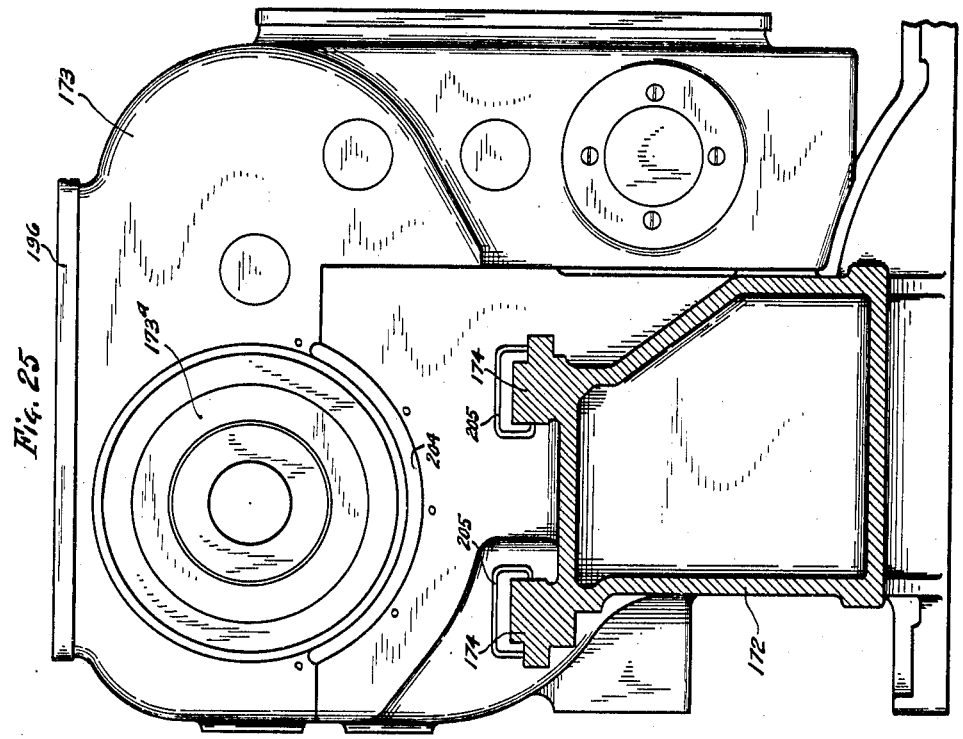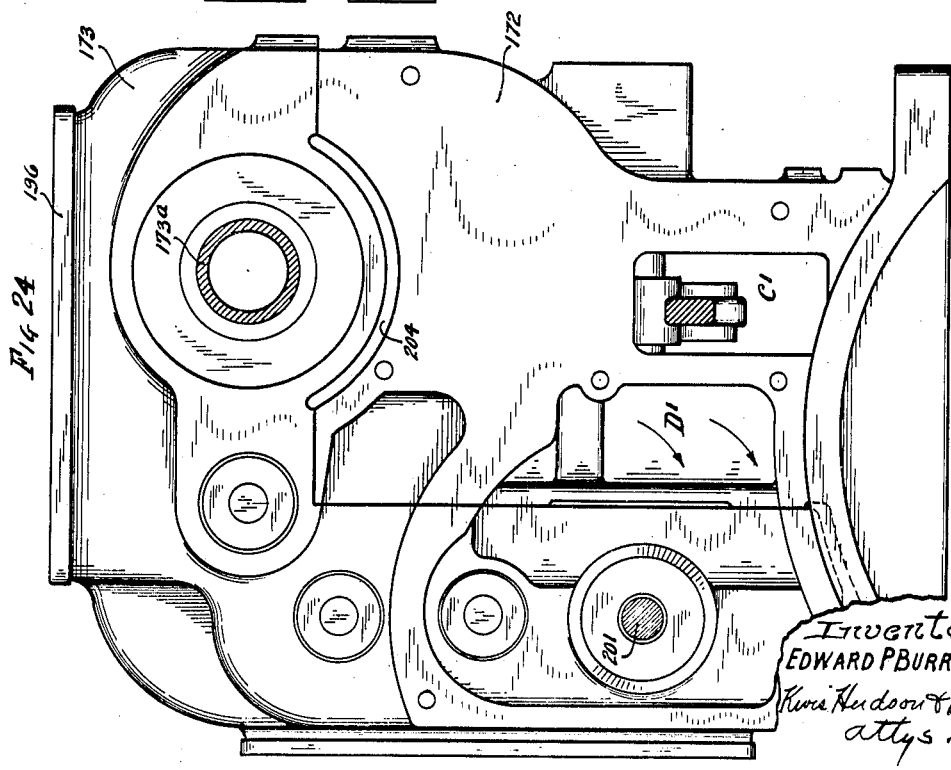

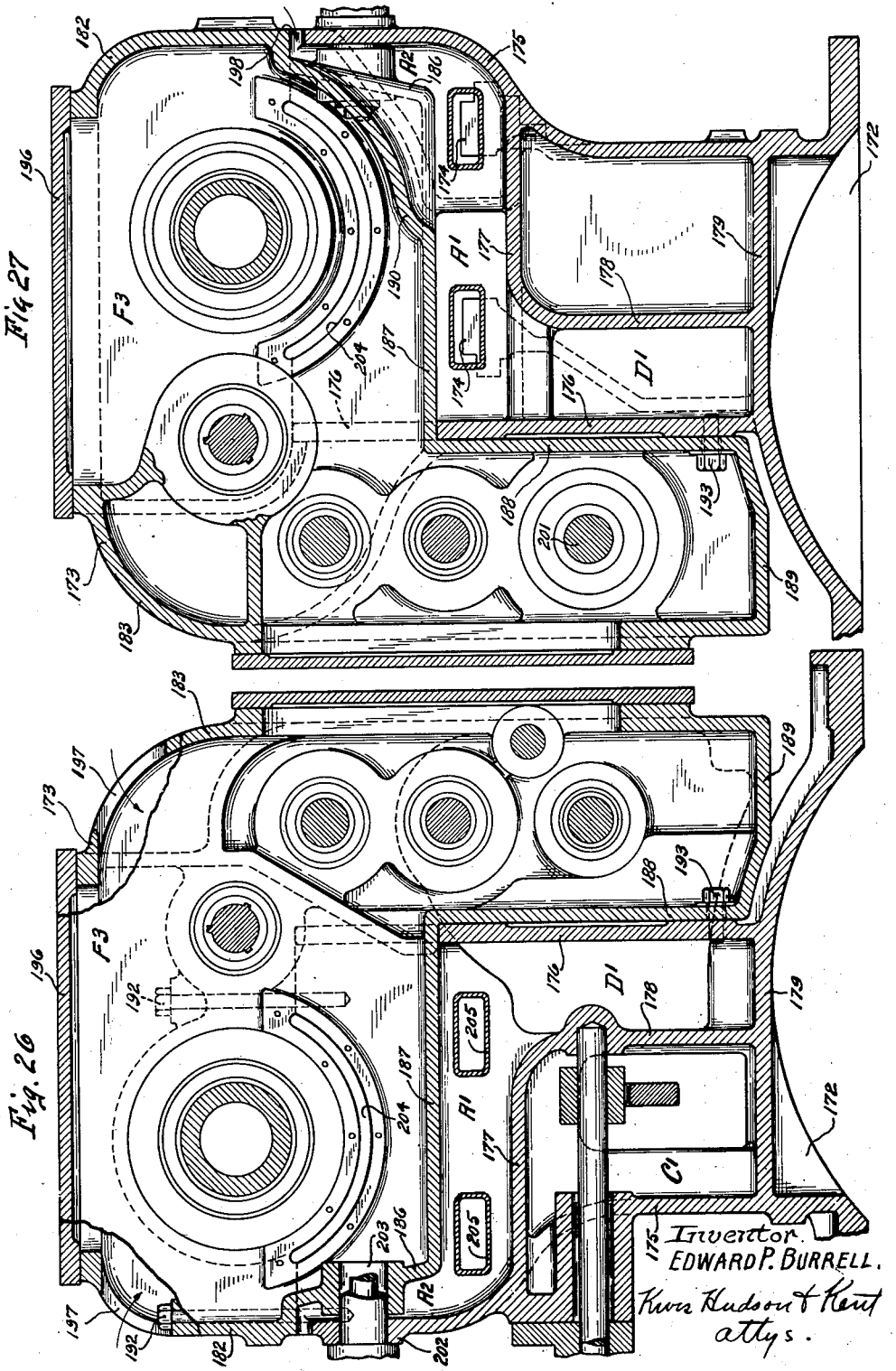

July 23, 1935.  E. P. BURRELL  2,009,354
MACHINE TOOL
Filed May 12, 1932   19 Sheets-Sheet 19
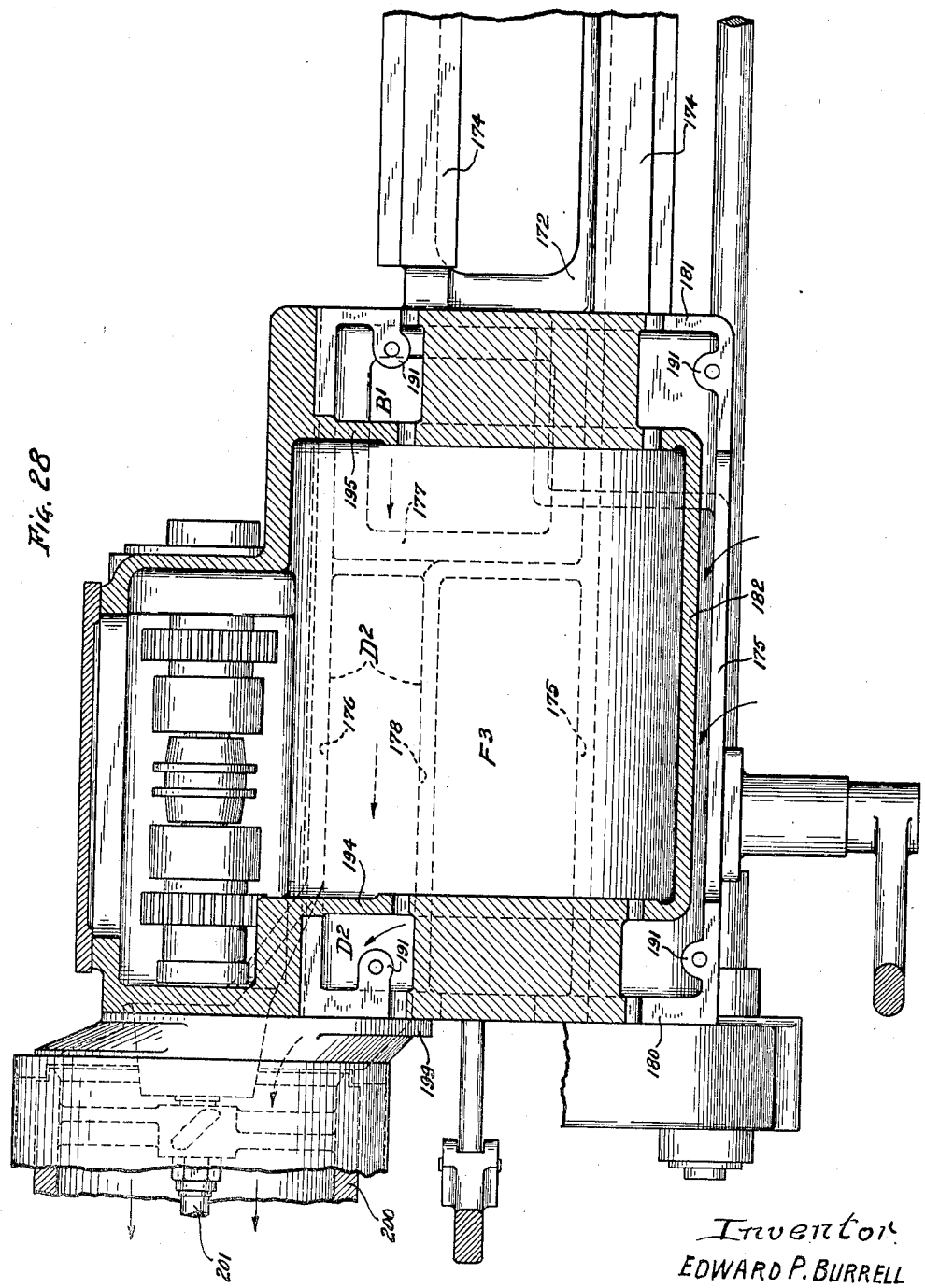

Patented July 23, 1935

2,009,354

UNITED STATES PATENT OFFICE 2,009,354

MACHINE TOOL

Edward P. Burrell, Shaker Heights, Ohio, assignor to The Warner & Swasey Company, Cleveland, Ohio, a corporation of Ohio Application May 12, 1932, Serial No. 610,904

43 Claims. (Cl. 82—32)

This invention relates to a machine tool and particularly to a system for controlling the temperature of those parts of a machine tool which are subject to temperature changes during the operation of the machine.

Heretofore the quality of the cutting tools used in machine tools has precluded the use of high operating speeds for the machine since the tools would break down when engaged with the work. The slow operating speeds under the old practice did not produce in the various operative parts of the machine sufficient heat to be detrimental to the machine or to said parts.

Under present day operating practice for machine tools the quality of the cutting tools is such that high operating speeds are usually imparted to certain of the movable parts, resulting in a substantially greater degree of heat being developed in the bearings, spindles, shafts and other parts of the machine, as well as in the lubricant for lubricating said parts, thus rendering it necessary that efficient means be provided for cooling the lubricant and such parts of the machine. The heat developed by such parts of the machine and in the lubricant, of course, results in wear and distortion of the machine due to the greater expansion of certain parts of the machine than occurs in other parts thereof.

An object of the invention is to provide in a machine tool efficient and effective means for controlling the temperature of certain parts of the machine and of the lubricant therefor that are subject to temperature changes during operation.

Another object is to provide means in a machine tool for maintaining the correct relationship between various parts of the machine that are subject to temperature changes during operation, to the end that the efficiency and accuracy of the machine will be retained.

Another object is to provide in a machine tool passageways in the machine through which fluid is circulated and which passageways are arranged adjacent to certain parts of the machine that are subject to temperature changes during operation and adjacent to the reservoir which holds the lubricant for such parts, whereby the circulating fluid will control the temperatures of said parts and lubricant.

Another object of the invention is to provide in a machine tool, having certain parts that are subject to temperature changes during operation, means for circulating fluid in thermal transferring relationship to said parts and to the lubricant therefor and in such volume, velocity, and temperature as to maintain said parts and lubricant substantially at a desired temperature.

A further object is to provide in a machine tool means for controlling the temperature of certain parts of the machine and the lubricant therefor, which includes means for circulating a fluid through the driving pulley of the machine.

A further object is to provide a machine tool construction embodying means for controlling the temperature of certain parts of the machine and the lubricant therefor, which is of such character that simplified castings may be used in the machine and difficult coring of the same substantially eliminated.

A still further and more specific object is to provide a machine tool construction wherein the head of the machine is a separate unit applicable as such to the bed of the machine, and wherein said head unit and the part of the machine which supports it and to which it is attached are formed with cooperating portions providing means for controlling the temperature of certain parts of the machine and the lubricant therefor.

Additional and further objects will appear hereinafter during the following detailed description of a number of embodiments of the invention.

Referring to the accompanying drawings disclosing a number of embodiments of the invention:

Figure 1 is a fragmentary front elevational view of a machine tool, showing particularly the head of the machine with the pulley and blower guard removed;

Fig. 2 is an end elevational view of the machine illustrated in Fig. 1, taken from the left-hand side of Fig. 1, and shows the leg of the machine housing the motor;

Fig. 3 is a fragmentary irregular section taken substantially on line 3—3 of Fig. 2, looking in the direction of the arrows, with certain parts omitted;

Fig. 4 is a transverse sectional view taken substantially on line 4—4 of Fig. 3, looking in the direction of the arrows with the cover plates for the segmental slots removed;

Fig. 5 is a transverse section taken substantially on line 5—5 of Fig. 3, looking in the direction of the arrows with the cover plates for the segmental slots removed;

Fig. 6 is an irregular horizontal section taken substantially on line 6—6 of Fig. 2, looking in the direction of the arrows, with the pulley and blower guard in position;

Fig. 6ª is a fragmentary detached detail view on a reduced scale showing in end elevation the fan and the blower guard in section;

Fig. 7 is a fragmentary rear elevational view with certain parts shown in section of a machine tool showing a modified form of the invention from that shown in Figs. 1-6, inclusive, certain parts of the machine being omitted;

Fig. 7a is a detached detail view partly in section of a modified form of construction from that disclosed in Fig. 7;

Fig. 8 is an end elevational view of the machine shown in Fig. 7, looking from the right-hand side thereof, certain of the parts being omitted and other of the parts being shown in section;

Fig. 9 is a transverse sectional view taken substantially on line 9—9 of Fig. 7, looking in the direction of the arrows;

Fig. 10 is a horizontal irregular sectional view taken substantially on line 10—10 of Fig. 8, looking in the direction of the arrows;

Fig. 11 is a fragmentary front elevational view of a machine embodying a still different modification of the invention from those disclosed in Figs. 1-10, inclusive; certain parts of the machine being omitted and other parts thereof being shown in section;

Fig. 12 is an end elevational view of the machine shown in Fig. 11 taken from the left-hand side thereof with certain of the parts omitted and other parts shown in section;

Fig. 13 is a transverse sectional view taken substantially on line 13—13 of Fig. 11, looking in the direction of the arrows;

Fig. 14 shows a still different form of the invention and is a fragmentary rear elevational view of a machine tool, certain parts of the machine being omitted;

Fig. 15 is a transverse sectional view taken substantially on line 15—15 of Fig. 14, looking in the direction of the arrows;

Fig. 16 is a fragmentary front elevational view of a machine embodying still another form of the invention;

Fig. 17 is an end elevational view of the machine shown in Fig. 16 and is taken from the left-hand end thereof;

Fig. 18 is a vertical sectional view on an enlarged scale taken substantially on line 18—18 of Fig. 17, looking in the direction of the arrows with the control unit removed;

Fig. 19 is a vertical transverse sectional view taken substantially on line 19—19 of Fig. 18, looking in the direction of the arrows, the motor and control unit being shown in elevation;

Fig. 20 is an irregular vertical transverse sectional view taken substantially on line 20—20 of Fig. 18, looking in the direction of the arrows;

Fig. 21 is a fragmentary front elevational view partly in section of a machine tool and shows a modified form of pulley and fan construction from that disclosed in Figs. 1 to 6 inclusive;

Fig. 22 is a view similar to Fig. 21 but showing a still different form of pulley and fan construction;

Fig. 23 is a fragmentary front elevational view, similar to Fig. 1, of a machine tool embodying a still further modified form of the invention from those disclosed in any of the previous figures;

Fig. 24 is an end elevational view of the machine tool shown in Fig. 23, looking from the left-hand side of said figure;

Fig. 25 is an end elevational view of the machine tool shown in Fig. 23, looking from the right-hand side of said figure;

Fig. 26 is a transverse vertical sectional view of the machine tool shown in Fig. 23 and is taken substantially on irregular line 26—26 of Fig. 23, looking in the direction of the arrows;

Fig. 27 is a transverse vertical sectional view taken substantially on line 27—27 of Fig. 23, looking in the direction of the arrows; and Fig. 28 is a horizontal sectional view taken substantially on line 28—28 of Fig. 23 looking in the direction of the arrows.

Although the invention contemplates broadly the provision of means in a machine tool for controlling the temperatures of various parts of the machine which are subject to temperature changes in operation, the practical embodiments of the invention illustrated in the accompanying drawings and described herein will relate by way of illustrations to the provision of means in the head of the machine for controlling the temperatures of the bearings, spindles, shafts and lubricant, but it should be understood that the invention is applicable also for controlling the temperatures of other parts of the machine which may contain bearings, shaftings and/or lubricant.

The employment of high grade cutting tools, as practiced at the present time in machine tools, has necessitated increased work spindle speeds, which results in greatly increasing the degree of heat developed by the various operative parts of the machine. In addition, the use of higher grade cutting tools results in greater thrust between the tools and work, with a consequent increase in the heat developed in the bearings during the operation of the machine. The continuous operation of machine tools, under the above mentioned conditions and for long periods of time brings about distortion in the different parts of the machine, because of the amount of heat developed therein, and unless this heat is kept at a minimum the accuracy and efficiency of the machine will be destroyed, due to the changed relationship between the parts.

The present invention contemplates the provision of means in a machine tool, which will maintain the various operative parts of the machine at the proper temperature, thereby eliminating distortion, retaining the accuracy and efficiency of the machine, and reducing to a minimum the wear occasioned in such parts during their operation.

Specifically, the invention contemplates the provision of means for maintaining the various operative parts of a machine tool at substantially room or any other desired temperature during the operation of the machine to thus attain the ends above specified.

Referring to the drawings, and particularly to Figs. 1 to 6a inclusive, there is disclosed a machine tool having a bed 25, a head 26, and ways 27 having a slide or slides (not shown) movably mounted thereon, as is well understood in the art.

A work spindle 28 is rotatably mounted in suitable bearings 29 and 30 supported in the head and is driven from a main drive shaft 31 mounted in suitable bearings 32 and 33 also supported in the head, through a train of change speed gearing (not shown) arranged on shafts 34, 35 and 36, all of which shafts are mounted in bearings likewise carried by the head. The drive for the work spindle is controlled by a stop and start lever 37 arranged on the front side of the head and operating a double clutch 38 on the drive shaft 31, by mechanism not shown, and by levers 39, 40 and 41 also mounted on the front of the head and controlling the shifting of the change speed gearing arranged on the shafts 34, 35 and 36 by mechanism not shown. Since the exact details of the drive for the work spindle, that is, the arrangement of the change speed gearing, the clutches and the means for shifting the same, form no part of the present invention, per se, it appears to be unnecessary to describe the same in greater detail than that set forth above.

A lever 42 is mounted at the front of the head upon a rotatable shaft 45 and is operatively connected with a chuck operating mechanism for the work spindle (shown in part) by means of links 43 and 44, the former of which is operatively connected to the shaft 45, while the latter of the links is operatively connected to the lever arm of a fork 46 pivoted, as indicated, at 47 upon the end of the head, such fork being connected to the chuck operating means referred to. Since the chuck operating means forms no part of the present invention, per se, further reference thereto, except in a general way, will be unnecessary.

The drive spindle 31 extends outwardly beyond the end of the head and has mounted thereon a pulley 31c which is driven by a belt from a motor 48 mounted in a leg casting 25a (see Fig. 2) beneath the head and bed.

The head 26 is preferably a substantially hollow casting, having therein a number of walls separating the interior of the head into a lubricant chamber, and passageways for the circulation of a temperature controlling fluid, in addition to a separate chamber housing the shaft 45 and links 43 and 44 and which is not in communication with the chamber or passageway previously referred to (see Figs. 3 and 4).

The head 26 has end walls 49 and 50 and walls 51 and 52 inwardly spaced relative thereto, respectively and joined by a connecting wall 53 extending in a longitudinal direction with respect to the head. It will be seen that the walls 49 and 51, 50 and 52, and 53, together with a wall 54 located below the wall 53 and spaced therefrom, form a continuous passageway A within the head from openings 55 arranged near the top and at the front and rear of the head adjacent one end thereof and openings 56 similarly arranged adjacent the other end thereof.

The walls 49 and 51 and 50 and 52 form the supports for the bearings 29 and 30 in which the work spindle 28 is mounted and also the supports for the bearings in which the shaft 36 is mounted, while the bearings for the shafts 31, 34 and 35 are supported in this instance from the end walls 49 and 50, see Figs. 3, 4 and 5. A cover plate 57 for the head closes the upper ends of the continuous passageway A and further serves to cover the lubricating chamber, which will shortly be described.

Referring to Figs. 4 and 5 it will be seen that the head is formed at the front of an irregular shaped wall 58 connected at its lower edge with a bottom wall 59, while the rear of the head is formed by a wall 60 having an inwardly extending boss 61 forming a support for the shaft 36 and being provided with an opening normally closed by a removable cover plate 62, the lower edge of the wall 60 merging with the bottom wall 59. The supports for the bearings in which the shafts 31, 34 and 35 are mounted are in the form of bosses extending inwardly from the end walls 49 and 50.

Intermediate the front wall 58 and the rear wall 60 and extending substantially parallel thereto are walls 63 and 64 connected at their upper ends to the wall 53 and at their lower ends to the bottom wall 59, see Figs. 4 and 5. Referring to Figs. 3 and 6, it will be seen that the walls 63 and 64 are connected at one end to the end wall 49 of the head and at their other end to an intermediate wall 65, extending crosswise between the walls 63 and 64 and that the walls just referred to, form a compartment which is connected at its upper end with the continuous passageway A, and is further subdivided into other compartments as hereinafter explained. Between the end wall 50, intermediate wall 65, bottom wall 59 and inwardly extending portions 58a and 60a of the front and rear walls respectively, there is formed a passageway B communicating with and forming a part of the continuous passageway A, referred to above, and located forwardly of the compartment formed by the walls 49, 53, 59, 63, 64 and 65.

Referring to Figs. 4 and 5, it will be seen that the wall 54 toward the rear of the head extends downwardly and joins the bottom wall 59, thus dividing the compartment formed by the walls 49, 53, 59, 63, 64 and 65 into a chamber C housing part of the chuck operating mechanism and into a substantially L-shaped passageway D. A wall 66 extends crosswise between the walls 63 and 64 and is connected to and forms with the bottom wall 59 and wall 65 a passageway E extending through the chamber C and passageway D and connecting the lower portions of the lubricant chamber, now to be referred to.

It will be seen that the interior of the head, except for the continuous passageways A, B, and D and chamber C, serves as a lubricant chamber indicated in the drawings at F, which chamber houses all the shafts and gearing, including the drive shaft 31 and the spindle 28. The chamber F is filled with lubricant to the desired level, and by means of a suitable pump, not shown, the lubricant can be circulated over the gears and through the bearings, the lower portions (designated herein at F¹ and F² respectively) of the lubricant chamber F, at the front and rear of the head and on opposite sides of the chamber C and passageway D, being connected by the passageway E to permit the lubricant to circulate freely from the front portion F¹ of the reservoir to the rear portion F² thereof.

It has been previously explained that the continuous passageway A is in communication with and merges into the passageway D and in effect forms part of said passageway. Referring to Fig. 6, it will be seen that the passageway D extends toward the end wall 49 of the head with the wall 64 curving rearwardly to form a funnel-like portion of the passageway D communicating with an opening in the wall 49. The opening in the end wall 49 is covered by an irregular shaped sleeve 67 secured to said wall and having at its outer end a circular bore into which extends a portion of the pulley 31c.

The pulley 31c is formed with a hub connected to the rim by means of spokes 68 which may be, as herein illustrated, in the form of fan plates or vanes, see Fig. 6. The shaft 31 is extended beyond the pulley and has fixed thereon a bracket 69 which supports a fan 70 having a series of spaced angularly positioned vanes 71 at its periphery while its rear side is open and in communication with the interior of the pulley 31c. The vanes 71 of the fan in this instance are so shaped as to draw fluid or air from the continuous passageways and the interior of the pulley when the shaft 31 is rotating and to discharge such fluid or air to the atmosphere. Preferably, but not necessarily, a blower guard 72, indicated herein in Figs. 6 and 6ª is secured to the belt guard 73 for the pulley, such belt guard being secured to the irregularly shaped sleeve 67.

Referring to Figs. 3, 4, 5 and 6, it will be noted that a pair of tubular members 74 and 75 extend longitudinally through the head and are in line with the ways 27 of the machine, see particularly Fig. 5. The tubular member 74 extends through the lubricant chamber F while the member 75 extends through the continuous passageway A, both members being welded at both ends to the end walls of the head and enabling the way-guards carried by the slide and overlying the ways 27 to extend into the head within said members.

Assuming the machine to be in operation and the main drive shaft 31 rotating at a constant high speed, and the work spindle rotating at the desired relatively high speed according to the change speed gears that are mounted on the shafts 34, 35 and 36, it will be seen that the fan 70 on the shaft 31 produces a strong suction resulting in fluid being drawn into the head through the openings 55 and 56, as indicated by the arrows in Figs. 1 and 4, and circulating around the bearings 29 and 30 for the work spindle and the bearings for the shaft 36, and into the continuous passageway A. From the passageway A, the fluid is drawn directly downwardly into the passageway D or it is drawn into the passageway B from which it passes into the passageway D, as indicated by the arrows in Fig. 6. From the passageway D the fluid is drawn by the fan 70 outwardly through the sleeve 67 and pulley 31ᶜ, and is then disposed radially from the fan into the blower guard 72 from whence it is discharged.

It will be seen that the fluid in passing through the head controls the temperature of the bearings for the work spindle 28 and shaft 36 since the fluid flows around said bearings and that the temperature of the walls separating the passageways A, B and D from the lubricant chamber F is controlled by the flow of the fluid over or along the same. As previously explained the lubricant in the lubricant chamber F is circulated by means of a suitable pump (not shown) into the bearings and over the shafts 31, 34, 35, and 36 and spindle 28 and the gearing carried thereby, the lubricant being thrown from said shafts and gearing upon the walls of the lubricant chamber and flowing over said walls downwardly into the portions F¹ and F² of the chamber, it being remembered that these portions of the lubricant chamber are connected at the bottom of the head by the passageway E. Since the fluid circulating through the head passes over the major portion of the walls of the lubricant chamber, it will readily be seen that it will have a decided temperature controlling effect upon said walls and that since the lubricant flows along the walls, the temperature of the lubricant will be controlled by the walls. It will further be noted that, since the fluid passageways B and D and the passageway A are located in the lower portion of the head and are surrounded by the portions F¹ and F² of the lubricant chamber and form the reservoir thereof that the circulating fluid passes through the reservoir portion of the lubricant chamber and therefore controls the temperature of the lubricant before it is circulated by the pump over the shafts, gearing, and bearings. It should further be noted that the lubricant is sprayed over the shafts and gearing and returns along the walls of the lubricant chamber toward the reservoir portion thereof, and therefore acts to control the temperatures of the front wall 58 and the rear wall 60 of the head maintaining such walls at substantially equal temperatures and thus eliminating distortion in the head occasioned by unequal expansion or contraction of said walls or any other walls not forming a part of the passageways A, B and D.

It will also be seen that the lubricant being forced into the bearings and around the walls of the support therefor controls the temperatures of the supports and prevents distortion therein, such controlling effect of the lubricant being increased by the fact that the fluid drawn through the openings 55 and 56 flows over and around the bearing supports.

The supports for the bearings 29 and 30 are sleevelike portions 76 and 77 merging into the walls 49, 51, 52 and 50, and in effect forming a part thereof as they are integral therewith. Since the bearings 29 and 30 are located near the top of the head it will be seen that those portions of the supports 76 and 77 and of the walls of which they are a part, that lie above the bearings, are substantially less in volume than are those portions lying below the bearings. Hence when the bearing supports are affected by temperature changes during operation of the machine, the portions thereof above the bearings will be more readily affected than the portions below the same, with the result that distortion will occur due to unequal expansion or contraction tending to raise the center of the spindle upwardly. In order to overcome this objection the walls 49, 51, 52 and 50 are provided beneath the bearings with segmental slots 78 spaced from the bearing a distance such that the volume of metal above and below the bearings will be substantially equal. Therefore, when the temperatures of the walls and the bearing supports 76 and 77 change, their expansion or contraction around the bearings will be substantially equal in both an upward and downward direction, with the result that the spindle 28 will be properly centered at all times. The slots 78 in the walls 51, 52 and 50 are covered by non-metallic cover plates 79, while the gear box 80 at the end of the head covers the slot in the wall 49, it being noted that said gear box 80 is secured to the head by bolts 81 so arranged that the gear box will not interfere with the expansion or contraction of the bearings.

Referring to Figs. 7, 8, 9 and 10 wherein a machine embodying a modified form of the invention is disclosed, there will be seen a machine tool having a substantially hollow head 81, a bed 81ª, ways 81ᵇ, and a work spindle 82 rotatably supported in bearings 83 and 84 carried by the walls of the head and controlled by suitable clutches and driven by a main drive shaft 86, through suitable gearing arranged on a countershaft 85 also rotatably mounted in the head the shaft 86 in turn being driven from any suitable source of power, such as the driving pulley 87. The head 81 has end walls 88 and 89 and intermediate transverse walls 90 and 91 spaced from the end walls respectively. The supports for the bearings 83 and 84 of the spindle 81 are integrally formed with the walls 90 and 88, and 91 and 89, see Fig. 10. The supports for the bearings for the main drive shaft 86 are similarly formed, while the supports for the bearings for the countershaft 85 are bosses 92 and 93 integral with the walls 90 and 91, there being a third bearing for the countershaft 85 between the other two bearings. The recess in the boss 93 in which the bearing is arranged is sealed by a plug 93ª, while the bearing recess in the boss 92 is sealed by the plug 92ª, such plug 92ª also enabling the bearing to be adjusted. Of course other suitable means may be employed for sealing the openings or the openings may be dispensed with entirely. The chamber formed by the walls 90, 91, the front wall 94 of the head, and the rear wall 95 thereof, together with a bottom wall 96, form a lubricant chamber substantially housing the spindle, shafts and gearing, the lower portion of which chamber is the lubricant reservoir. Lubricant is circulated by means of a suitable pump, not shown, from the lubricant reservoir through the bearings and over the spindle, shafts and gearing, from which it flows along the walls into the reservoir portion of the chamber.

The continuous passageways G and H are formed in the head by the walls thereof and surround the bearings, these passageways being connected at the lower portion of the head by a passageway I extending longitudinally of the head and formed by the front wall 94, rear wall 95, bottom wall 96, and a wall 97 spaced below the bottom wall 96 and parallel thereto.

The head 81 is provided with a cover plate 98 which closes the upper ends of the passageways G and H and also the lubricant chamber in the head. The cover plate 98 is provided with openings communicating with the passageways G and H, respectively, such openings being normally closed by means of threaded plugs 99 to enable the passageways G, H and I to be filled with a suitable fluid.

The rear wall 95 of the head is provided with a cover plate 100 to give access to the gearing and clutches in the lubricant chamber and is provided at its opposite ends with vertically extending openings 101 and 102 communicating respectively with the passageways G and H. Within the passageways G and H and adjacent to the openings 101 and 102, but spaced inwardly therefrom, there are provided vertically extending baffle ribs or plates 103 separating the passageways G and H at the rear of the head into two portions for a purpose later to be explained. A substantially U-shaped tubular member 104 has its vertically extending legs secured to the rear wall 95 of the head by screws or other suitable means in overlying relationship with respect to the openings 101 and 102 so as to seal said openings. The upper ends of the legs of the member 104 are open and the vertically extending portions of the legs are provided with a series of spaced radiating fins or vanes 105. The member 104 is preferably formed of light material having good thermo conductive characteristics and is provided at its lower portion and adjacent to the drive pulley 87 with a funnel-shaped enlargement 106 having a bore and supporting therein a shaft upon which is arranged a fan 107 and a pulley 108. The pulley 108 is driven by means of a belt from a pulley 109 arranged on the main drive shaft and it will be seen that when the fan 107 is rotating fluid will be forced into or withdrawn from the member 104 depending upon the direction of rotation of the fan 107 resulting in a flow of fluid through the member 104. In order to direct the flow of fluid through the member 104 and into both legs thereof a deflector rib 110 is provided within the member at the lower end of the leg adjacent to the fan 107.

The passageways G, H and I having been filled with the fluid and the machine being in operation, it will be seen that a circulation of fluid through both legs of the member 104 takes place and that such fluid passes over the radiating fins or vanes 105. The fluid in the passageways G, H, and I being in contact with the walls of the lubricant chamber and with the bearing supports controls the temperature of said walls and supports. However, the temperature of the fluid in the passageways immediately adjacent to the openings 101 and 102 and between the same and the baffle ribs or plates 103 is controlled because of its contact with the inner wall of the legs of the member 104 and therefore a temperature differential will be created in different portions of the fluid and continuous circulation of the fluid in the passageways will take place, such circulation being either in the direction of the arrows in Fig. 9 or in the opposite direction, depending upon whether the temperature of the fluid is lowered or raised. The passageways G and H being connected by the lower passageway I, it will be seen that any differences in the temperature of the fluid in one passageway over the other will be neutralized and that the temperatures of the fluid in both passageways will be maintained substantially equal.

Since the fluid is in contact with the walls of the lubricating chamber and the supports for the bearings it will be readily appreciated that the temperature of said walls and supports will be controlled by the fluid and that the lubricant which is circulated by the pump, not shown, into the bearings and over the gearing and shafting returns to the lubricant reservoir over the walls of the lubricant chamber and its temperature is thus controlled prior to reaching the reservoir. The temperature of the lubricant in the reservoir is further controlled by the fluid in the passageway I which is in contact with the bottom wall of the lubricant chamber.

Referring to Fig. 7ª, there is disclosed a modified form of the member 104 shown in Figs. 7 to 10 inclusive. In Fig. 7ª the member 104ª is provided with vanes or fins 105ª similar to the vanes or fins 105 of member 104. However, in place of circulating a fluid over the fins or vanes by means of a fan the modified construction is such that fluid is circulated thereover by gravity. The upper end of the member 104ª is connected to a funnel 104ᵇ carried by a valved conduit 104ᶜ while the lower end of the member 104ª is closed except for an opening with which a conduit 104ᵈ registers.

The fluid enters the member 104ª through the funnel 104ᵇ and leaves the member through the conduit 104ᵈ, such fluid in its passage through the member passing over the vanes or fins 105ª and controlling the temperature thereof. It will be understood that members 104ª may be located at each end of the head in positions corresponding to the positions occupied by the leg portions of the member 104.

Referring to the form of the invention disclosed in Figs. 11, 12 and 13, there is shown a bed 111ª having ways 111ᵇ and a head 111 of a machine tool, which head has end walls 112 and 113 and intermediate transverse walls 114 and 115, the end walls and the intermediate walls being spaced apart and forming therebetween passageways J and K. The walls 114 and 115 are connected at their lower ends by a wall 116 which together with another wall 117 located below it and spaced therefrom forms a passageway L connecting the passageways J and K. The front wall 118 of the head is formed with two spaced portions 118ª and 118ᵇ extending downwardly from a point substantially at the height of the work spindle with the portion 118ᵇ merging into the wall 116 and into the transverse walls 114 and 115, while the portion 118ª is a continuation of the front wall 118 and merges into the wall 117. The wall 118 is provided with one or more openings 119 leading into the space between the portions 118ᵇ and 118ª and is further provided adjacent each end of the head and at the top thereof with openings 120 leading into the passageways J and K. The rear wall 121 of the head is also provided with similar openings 120ª, communicating with the passageways J and K. A cover plate 122 closes the upper ends of the passageways J and K and also the lubricant chamber formed by the front wall 118, rear wall 121, intermediate walls 114 and 115, and wall 116. As in the form of the invention just above described in Figs. 7 to 10 inclusive, the work spindle 123, main drive shaft 124 and countershaft 125, upon which are arranged the change speed gearing and clutches, are rotatably supported in bearings similar to those shown in the figures referred to and in which the bearing supports are formed integral with the walls 112, 114 and 113, 115. The wall 117 at the end of the head adjacent to the drive pulley is extended downwardly to provide a funnel-like portion of the passageway L, which portion connects with a circular opening in the wall 112 of the head. A supporting sleeve 126 is secured to the wall 112 and surrounds the opening therein, such sleeve having a bore and being provided with spaced bearing supports 127 for a shaft upon which is fixed a fan 128 and a pulley 129. The pulley 129 is driven by a belt from a pulley 130 fixed on the main drive shaft 124.

Within the passageway L and adjacent to the fan 128 is a deflector rib 131 which directs the currents of fluid from the passageways J and L into the opening and sleeve 126 when the fan is rotating in one direction or, when the fan is rotating in the opposite direction, directs the currents of fluid into the passageways J and L, respectively, as indicated by the arrows in Fig. 11.

It will be seen that when the machine is in operation and lubricant within the lubricant chamber is being distributed into the bearings and over the spindle shafts and gearing by a pump, not shown, the lubricant will return to the reservoir portion of the lubricant chamber over the walls of the chamber and particularly over the front wall of the chamber, since the spindle is normally rotated in a clockwise direction. However, since the fan 128 will be creating a circulation of fluid in the passageways J, K and L and in the space between the portions 118ª and 118ᵇ of the wall 118, it will be seen that the temperature of the walls over which the lubricant is flowing will be controlled by the circulating fluid in contact therewith, and that the temperature of the lubricant in the reservoir portion of the chamber will thus be controlled. Furthermore, since the passageway L extends beneath the lubricant chamber and the fluid passing therethrough is in contact with the bottom of the chamber the temperature of the lubricant in the reservoir portion of the chamber will be still further controlled by the fluid circulation.

It will also be noted that the fluid circulating through the passageways J and K passes around and over the bearing supports for the shaft and spindle and thus acts to directly control the temperature of the bearings.

When the fan 128 rotates in one direction, fluid will be forced thereby into the passageway L and part of it will be directed by the deflector rib 131 into the passageway J and out through the openings 120 and 120ª, while the remainder will pass on into the passageway L from whence a portion passes through the passageway K and out through the openings 120 and 120ª, while the remaining portion passes through the space between the wall portions 118ª and 118ᵇ of the front wall and out through the openings 119 (see arrows in Figs. 11 and 13). If the fan 128 is rotating in the opposite direction it will be seen that the fluid will be drawn into the passageways J and K through the openings 120 and 120ª and also drawn into the space between the portions 118ª and 118ᵇ of the front wall through the openings 119, from whence it passes into the passageway L and out through the sleeve 126.

A still further form of the invention is illustrated in Figs. 14 and 15 wherein it is proposed to have a positively circulated fluid filling the passageways in the head. The machine tool shown in this form comprises a bed 132ª, ways 132ᵇ and a head 132, as is well understood, while the spindle, shafts and gearing correspond to those parts as illustrated in Figs. 7 to 10 inclusive, and are designated by the same reference characters. It will be seen that between the end walls 133 and 134 of the head and intermediate walls 135 and 136 passageways M and N are provided which extend around the bearings for the spindle and shafts and are connected at their lower ends with a passageway O extending between the front wall 137, rear wall 138, bottom wall 139 of the lubricant chamber, and a wall 140 spaced below the same. The construction of the bearings for the spindle and shafts and the change speed gearing and clutches arranged thereon is exactly the same as in the form illustrated in Figs. 7 to 10 inclusive. Valved conduits 141 communicate with the upper ends of the passageways M and N, while another valved conduit 142 communicates with the passageway O. By properly regulating the valves of the conduits 141 and 142 the passageways M, N and O may be filled with fluid and a constant positive circulation of said fluid through the passageways can be maintained, it being understood that the fluid may be introduced into the passageways through the conduits 141 and removed therefrom through the conduit 142 or that it may be introduced in the reverse direction through the conduit 142 and removed through the conduit 141.

A cover plate 143 covers the upper ends of the passageways M and N and the lubricant chamber. When the machine is in operation lubricant is distributed by means of a pump, not shown, into the bearings for the spindle and shafts and over the gearing thereon, such lubricant returning to the reservoir portion of the lubricant chamber along the walls of the chamber. However, since the positively circulated fluid in the passages M, N and O is in contact with the walls 135, 136 and 139 of the lubricant chamber, it will be seen that the temperature of said walls is controlled by the fluid and that when the lubricant is carried by the pump from the reservoir portion and is again distributed around the bearings and over the gearing, the temperature of the lubricant will be of the desired degree and will have an increased temperature controlling effect upon the parts over which it flows. Also the fluid in the passages M and N surrounds and is in contact with the supports for the bearings and shafts and will thus act to control the temperature of said bearings.

A still further form of the invention is illustrated in Figs. 16 to 20 inclusive, wherein the work spindle constitutes the rotor spindle of the electric motor that directly drives said work spindle. The machine tool illustrated comprises a bed 144a, ways 144b, and a head 144 formed with end walls 145 and 146 and with intermediate walls 147 and 148 forming passageways P and Q, which passageways surround bearing supports 149 and 150 formed integral with the walls 145 and 146 and connected to walls 147 and 148 by rib portions 147b and 148b. The passageways P and Q extend downwardly in the head and are in communication with a chamber R which houses a controller unit U for the motor, and are in communication with the atmosphere through an opening 151 in the lower end portion of the head.

The work spindle 152 which serves also as the rotor spindle of the electric motor, is rotatably mounted in bearings 153 and 154 in the bearing supports 149 and 150 and has fixed thereon, intermediate funnel-shaped portions 147a and 148a of the walls 147 and 148, a rotor indicated generally at 155. The work spindle 152 carries fan blades 156, in this instance located at each side of the rotor, which blades are so positioned and shaped as to throw fluid radially outwardly when the rotor is rotating for a purpose later to be explained.

The stator of the motor, indicated at 157, is secured to the front wall 158 and the rear wall 159 of the head by means of suitable securing bolts, as indicated at 160, see Fig. 19. Between the securing points of the stator there is an opening 161 forming a passageway connecting the space surrounding the opposite ends of the stator. A cover 162 is positioned over the stator and is provided in its front and rear walls with louvres 163.

It will be seen that when the motor is operating and the work spindle is rotating, the fan blades 156 on the rotor force fluid radially outwardly and through the louvre openings, (see arrows in Fig. 19) and that this circulation of fluid produces a suction through the head which draws fluid into the lower portion thereof through the opening 151 from whence it passes into the passageway P and into the chamber R and around the controller unit U for the motor. The fluid drawn into the passageway P passes around the bearing support 149 and through the funnel-like portion 147a of the wall 147 and into the interior of the stator, as indicated by the arrows in Fig. 18. A portion of the fluid in the chamber R passes through an opening into the passageway Q and around the bearing support 150 from whence it passes into the interior of the stator through the funnel-like portion 148a of the wall 148, as indicated by the arrows in Fig. 18. Another portion of the fluid in the chamber R passes directly from said chamber through an opening into the interior of the head where it circulates around both sides of the stator and through the passage 161 between the points of attachment for the stator, as indicated by the arrow in Fig. 18. In addition to the fluid passing outwardly of the head through the louvres 163, a portion will pass directly from the interior of the head adjacent the lower part of the stator outwardly through the opening 164 at the rear of the head, as indicated by the arrow in Fig. 19.

From the foregoing description it will be seen that during the operation of the machine there is a constant flow of fluid over the bearing supports, thus controlling the temperature of the bearings. In addition, there is a circulation of fluid through the chamber R in which the motor controller is arranged, to the end that the temperature of the controller unit U will be controlled thereby.

Since a single spindle is employed in this form of the invention without the use of a drive shaft, countershaft, gearing and clutches, it is unnecessary to provide a lubricant chamber or a lubricant circulating device, since the bearings of the single spindle may be properly lubricated by individual oiling devices. It will be understood, of course, that various spindle speeds may be imparted to the work spindle by means of the motor controller unit U, which controls the speed of operation of the motor, such controller unit being operated by the stop, starting, and reverse lever 165 and a speed control lever 166 located at the front of the machine.

In Figs. 21 and 22 there are disclosed modified forms of the driving pulley and fan construction illustrated in Figs. 1 to 6a inclusive. Referring to Figs. 21 and 22, the bed of the machine is illustrated at 25, the head at 26, and the drive motor at 48, upon the rotor shaft of which is arranged a pulley similarly as indicated in Fig. 2.

Referring specifically to Fig. 21, it will be seen that a second pulley, indicated at 167, is located on the rotor spindle of the motor 48 outwardly of the main pulley. The sleeve 67 is similarly attached to the end wall of the machine, as in Fig 6, while the drive shaft 31a extends through the sleeve 67 and carries the spoked drive pulley 31c. A fan 168 is mounted on the shaft 31a to have independent rotation thereon, such fan being arranged within the bore of the pulley 31c and carrying outwardly thereof a pulley 169 driven by the pulley 167. It will be noted that the sizes of the main pulley on the rotor shaft and of the drive pulley 31c are such that the shaft 31a will rotate at a reduced number of revolutions with respect to the rotor shaft, while the sizes of the pulleys 167 and 169 are such that the fan 168 will rotate at a substantially increased speed over the pulley 31c.

The rotation of the fan 168 causes a circulation of fluid through the passageways in the head and through the passageway D, sleeve 67 pulley 31c and openings in guard 170, so as to control the temperatures of the bearings, spindle, shafts, gearing, and lubricant in the head, as described in connection with Figs. 1 to 6a inclusive, and as indicated by the arrows in Fig. 21. It will be understood that the sizes of pulleys 167 and 169 may be changed to impart a predetermined speed of rotation to the fan 168 to produce a desired amount of circulation of fluid through the passageways in the head of the machine.

Referring to Fig. 22, the pulley 167a is located inwardly of the rotor shaft pulley and drives a pulley 169a carried by the fan 168a arranged for independent rotation on the drive shaft 31b inwardly of the spoked drive pulley 31c and within the bore of the sleeve 171 that is secured to the end wall of the head 26. The operation and function of the construction just described are exactly the same as in the construction shown in Fig. 21 and the fluid passes outwardly of the head through an opened end guard 170ª, as indicated by the arrows in Fig. 22. It will be understood that the member 171 is provided with openings for the belt driving the fan pulley 169ª.

In the forms of the invention previously described, and especially that form shown in Figs. 1 to 6ª inclusive, the head and bed of the machine tool are formed of a single or unitary casting and the passageways and chambers provided therein by means of coring. This arrangement is such as to require more complicated coring thus increasing the cost of the casting and of the machine tool. In the form of the invention illustrated in Figs. 23 to 28, inclusive, it is proposed to have the head formed of a separate casting from the bed casting, but applicable to the bed casting as a unit, the head casting and the bed casting being provided with cooperating portions forming, when the two castings are assembled together, passageways substantially similar to the passageways in the form shown in Figs. 1 to 6ª, inclusive. The arrangement just specified substantially eliminates the necessity for complicated corings in the castings and thereby reduces the cost of the castings and of the machine tool.

Referring to Figs. 23 to 28, inclusive, the machine tool illustrated therein includes a bed 172, a head 173 having therein the spindle 173ª, and ways 174 having a slide or slides (not shown) movably mounted thereon, as is well understood in the art. The bed 172 is in the form of a casting having at the head end of the machine a hollow portion and supporting the head 173, which is a separate casting arranged upon and secured to the bed 172. The bed 172 at the head end of the machine is provided with a front wall 175 and a rear wall 176 having a cut-away portion adjacent its upper edge and intermediate its ends, as clearly shown in Figs. 26 to 28, inclusive. The front wall 175 of the bed curves inwardly toward the rear wall 176 intermediate its ends and is connected to the rear wall 176 adjacent such portion by a horizontally extending wall 177 having intermediate its ends a downwardly extending portion 178 connected to the bottom wall 179 of the bed. The bed 172 at its head portion is provided with end walls 180 and 181, as clearly shown in Figs. 23 and 28. It will be noted that the rear wall 176, wall 177, downwardly extending portion 178 of the wall 177 and bottom wall 179 form a chamber C¹ in which is housed a part of the chuck operating mechanism, later to be referred to.

As previously explained, the head 173 is formed by a separate casting which is supported upon the upper side of the hollow portion of the bed and has a downwardly extending portion lying against the rear wall 176 of the bed. The head casting comprises a front wall 182, a rear wall 183 and end walls 184 and 185. The front wall 182 is connected to the rear wall 183 by an irregular shaped wall comprising a downwardly extending portion 186, a horizontally extending portion 187, and a vertically extending portion 188 connected at its lower end with the rear wall 183 by a bottom portion 189. The downwardly extending wall portion 186 is provided adjacent the end wall 185 with an inwardly offset curved portion 190 to provide clearance for the slidable member mounted on the ways 174.

The head portion of the bed is provided adjacent its upper side with a plurality of bosses 191 having threaded openings for receiving securing bolts 192 carried by the head casting and acting to clamp the same to the head portion of the bed. The downwardly extending portion of the head lies against the rear wall 176 of the bed and is secured thereto by means of securing bolts 193, it being noted that the bolts 193 are arranged in slot-like openings to allow expansion or contraction of the downwardly projecting portion of the head.

The head 173 is provided with intermediate transversely extending walls 194 and 195, which walls are connected at their lower ends with the wall portion 187. It will be noted that the intermediate walls 194 and 195, together with the cover plate 196 and the wall portions 187, 188 and 189 and the rear wall 183 form a lubricant chamber F³ in which are housed the shafts, gearing and spindle, as described in connection with the machine tool shown in Figs. 1 to 6ª inclusive, the arrangement of such parts being the same as in the previously described form.

A substantially U-shaped passageway A¹ surrounds the upper portion of the lubricant chamber F³ and communicates with the atmosphere through openings 197 formed in the front and rear walls of the head adjacent the opposite ends thereof, the passageway A¹ being similar to the passageway A in the form described in Figs. 1 to 6ª, inclusive, and surrounds the bearings for the upper shaft and the spindle.

It will be noted that the passageway A¹ adjacent the front of the machine communicates with a passageway A² lying between the bed and the head, which passageway in turn communicates with an opening 198 located in the front wall of the machine, see Figs. 23, 26, 27 and 28. The passageway A¹ adjacent the right-hand end of the head, as viewed in the drawings, communicates with a downwardly extending passageway B¹ which communicates at its lower end with a passageway D¹. Since the passageway D¹ extends longitudinally of the machine in the bed and is formed by the downwardly extending wall portion 178 and the rear wall 176 of the bed, it will be seen that the passageway D¹ and the passageway A¹ are merged together throughout a substantial part of the length of the passageway A¹, as clearly shown in Figs. 26 and 27.

The passageway D¹ communicates with a funnel-like opening D² formed in the left-hand end of the bed, such opening being covered by an irregular shaped sleeve 199 secured to the end wall and having at its outer end a circular bore into which extends a portion of the pulley 200. The sleeve 199 and the interior of the pulley 200 are of the same construction as the sleeve 67 and pulley 47, shown in Fig. 6, it being noted that the sleeve 199 and the interior of the pulley 200 form a continuation of the passageway D². As previously described in connection with the form illustrated in Figs. 1 to 6ª, inclusive, the shaft 201 is extended beyond the pulley and has fixed thereon a bracket which supports a fan (not shown) similar to the fan 70 illustrated in Fig. 6, which fan, together with the pulley 200, serves to draw fluid or air from the passageway D² and the interior of the head when the shaft 201 is rotated and to discharge such fluid or air to the atmosphere.

When the machine is operating air or fluid will be circulated through the passageways in the head and bed, as indicated by the arrows, in a manner similar to the circulation of air or fluid through the head of the form of the invention disclosed in Figs. 1 to 6ª, inclusive, it being noted, however, that in the present form the air or fluid is drawn in through the opening 198 and passes through passageway A² into passageway A¹. The air or fluid circulating through the passageways passes around the bearings and over the walls of the lubricating chamber F³.

The front wall 175 of the bed is provided with a boss 202 having openings arranged therein through which extend the shafts for operating the gear shifting mechanism, it being noted that said shafts are supported in a bearing-like boss 203 formed in the wall portion 186 of the front wall 182 of the head. It will also be seen that the mechanism for operating the chuck in the spindle is the same in this form of the invention as in the form shown in Figs. 1 to 6ª, inclusive.

In the present form of the invention arcuate slots 204 are formed beneath the bearing supports for the main spindle, such slots corresponding in shape and function to the slots 78 referred to in connection with the form shown in Figs. 1 to 6ª, inclusive. The slots 204 are four in number, the two outer ones being formed partly by the end walls of the head and partly by the end walls of the bed, while the two inner ones are formed solely in the intermediate walls 194 and 195 of the head. The slots 204 may be covered by suitable non-metallic cover plates 79, as shown in Fig. 3 of the drawings. The end walls of the head portion of the bed are provided with openings in which are secured the ends of tubular members 205 corresponding to the tubular members 74 and 75, as shown in Fig. 6, except that both of the members 205 project through the passageway A¹, whereas the member 74 projected through the lubricant chamber F¹, in the previously described form of the invention.

It will be noted that, although the passageways, shown in Figs. 23 to 28, inclusive, through which the fluid is circulated to control the temperature of the movable parts and of the lubricant, are substantially the same as the passageways shown in Figs. 1 to 6ª, inclusive, the passageways in the last described form of the invention are formed in part by the head casting and in part by the bed casting and that, therefore, the coring required for the formation of such passageways is materially simplified.

It will be seen that in all the forms of the invention described herein means is provided for controlling the temperature of the bearing supports for the spindle and shafts and/or for controlling the temperature of the lubricant for said bearings, spindle and shafts, and the gearing and clutches arranged thereon. The provision of the temperature controlling means disclosed herein enables the machine to be operated at extremely high speeds and continuously for long periods of time since the temperatures of all of the parts which are subject to temperature changes in operation are adequately controlled, and, in fact, are maintained substantially at the desired temperature for the most efficient operation under varying working conditions. Furthermore, due to the employment of the controlling means referred to, the temperatures of the various parts of the machine are maintained substantially equal and, therefore, distortion which would otherwise develop in certain of the parts is substantially eliminated, thus increasing the accuracy and efficiency of the machine.

In the use of the improved cutting tools of the present time it is possible to maintain greater operating speeds under increased cutting pressures and greater thrust, both of which result in a tendency for greater temperature changes to occur in the operative parts of the machine and the lubricant therefor, however, because of the arrangement disclosed herein such parts of the machine are maintained at substantially the desired temperature.

It should further be noted that the present invention discloses an arrangement wherein the expansion and contraction of the bearing supports above and below the bearing are maintained equal so that the spindle will not become misaligned and the accuracy of the machine thus affected.

It should furthermore be noted that in accordance with one form of the present invention the operating motor for the spindle may be arranged directly on said spindle which serves as the rotor spindle of the motor, and that provision is made in this form for adequately controlling the temperatures of the bearing supports for the spindle, the walls of the head and the controller unit for the motor.

It will also be seen that in the form of the invention just referred to the fan for creating the circulation of fluid through the head is carried by the work spindle and that the passageways are so formed that the action of this fan in forcing fluid radially outwardly from the spindle creates a suction which draws the fluid into the head from the lower portion thereof and upwardly over the bearing supports and into the stator.

It should also be noted that in the form of the invention disclosed in Figs. 1 to 6 inclusive, the fan for setting up the fluid circulation in the passageways in the head is mounted on the drive shaft outwardly of the driving pulley therefor and that said fan draws the fluid through the interior of the pulley and disburses the same radially outwardly through a blower guard covering the pulley.

It will further be noted that in the forms of the invention disclosed in Figs. 21 and 22, the fans rotate independently of the drive pulleys and preferably at increased speed, and that such fans are arranged either within the bore of the drive pulley or within the bore of the sleeve that is secured to the end wall of the head. It will be understood that rotation of the fans in one direction will force fluid through the bores of the pulley and sleeve into the passageways in the head, while rotation of the fans in the opposite direction will draw fluid from the passageways through the bores of the pulley and sleeve.

The form of the invention illustrated in Figs. 7 to 15 inclusive is described and claimed in my copending divisional application, Serial No. 27,740, filed June 21, 1935, while the subject matter illustrated in Figs. 16 to 20 inclusive is described and claimed in my copending divisional application, Serial No. 27,739, filed June 21, 1935.

Although several preferred embodiments of the invention have been illustrated and described herein it should be understood that the invention is susceptible of various other modifications and adaptations within the scope of the appended claims and that means similar to those herein described may be employed in connection with the controlling of the temperature of other parts of a machine wherein there are bearings, shafting and gearing, such as aprons, gear boxes, and other similar parts which may be subject to temperature changes in operation, and that the illustration of the temperature controlling means in the headstock of a lathe is purely by way of example.

Having thus described my invention, I claim:

1. In combination with a machine tool having a lubricant chamber, a passageway substantially surrounding said chamber, and means for circulating fluid in said passageway to control the temperature of the lubricant in said chamber.

2. In combination with a machine tool having a lubricant chamber, a passageway having walls in common with certain of the walls of said chamber, and positive means for circulating a fluid in said passageway and along said walls to control the temperature of the lubricant in said chamber.

3. In combination with a machine tool having movable parts, bearings for said parts, a chamber adapted to contain lubricant for said bearings and parts, a passageway substantially surrounding said chamber, and means for circulating a fluid in said passageway to control the temperature of the lubricant in said chamber.

4. In combination with a machine tool having a movable part, bearings for said part, a chamber for lubricant for said bearings and part, a passageway surrounding said bearings and substantially surrounding said chamber, and means for circulating fluid in said passageway to control the temperature of said bearings and the lubricant in said chamber.

5. In combination with a machine tool having a movable part, bearings for said part, a chamber for lubricant for said bearings and part, a passageway surrounding said bearings and having walls in common with certain of the walls of said chamber, and means for circulating a fluid in said passageway to control the temperature of said bearings and the lubricant in said chamber.

6. In combination with a machine tool having a lubricant chamber in a portion thereof, a passageway having a portion substantially embraced by said chamber, and means for circulating a fluid in said passageway to control the temperature of the lubricant in said chamber.

7. In combination with a machine tool having a lubricant chamber, a passageway embracing a portion of said chamber, and means for circulating a fluid in said passageway to control the temperature of the lubricant in said chamber.

8. In combination with a machine tool having a lubricant chamber, a passageway, said lubricant chamber having portions embracing said passageway, said passageway having portions embracing said lubricant chamber, and means for circulating a fluid in said passageway to control the temperature of the lubricant in said chamber.

9. In combination with a machine tool having a lubricant chamber, a passageway having portions embracing said chamber, movable parts substantially housed in said chamber, bearings for said parts arranged in the embracing portions of said passageway, and means for circulating a fluid in said passageway to control the temperature of said bearings and the lubricant in said chamber.

10. In combination with a machine tool having a lubricant chamber, a passageway, portions of said chamber embracing said passageway, portions of said passageway embracing said chamber, movable parts substantially housed in said chamber, bearings for said parts arranged in said passageway, and means for circulating a fluid in said passageway to control the temperature of said bearings and the lubricant in said chamber.

11. In combination with a machine tool having a lubricant chamber, a passageway, said chamber having portions located at the sides of said passageway and a portion located above said passageway, and means for circulating a fluid in said passageway to control the temperature of the lubricant in said chamber.

12. In combination with a machine tool, a passageway, a lubricant chamber surrounding said passageway, and means for circulating a fluid in said passageway to control the temperature of the lubricant in said chamber.

13. In combination with a machine tool having a lubricant chamber, a passageway substantially surrounding said chamber, and means for circulating a fluid from one end of the passageway toward the opposite end thereof.

14. In combination with a machine tool having a movable part, bearings for said part, a lubricant chamber, a passageway surrounding said bearings and substantially surrounding said chamber, and means for circulating fluid from one end of said passageway toward the opposite end thereof.

15. In combination with a machine tool having a lubricant chamber, a passageway substantially surrounding said chamber, and means located adjacent an end of said passageway for circulating a fluid therethrough.

16. In combination with a machine tool having a lubricant chamber, a passageway substantially surrounding said chamber and opening at its ends outwardly of the machine, and means for circulating a fluid through said passageway.

17. In combination with a machine tool having a lubricant chamber, a passageway having its opposite ends opening outwardly of the machine, a second passageway having one end opening outwardly of the machine and its opposite end communicating with said first named passageway, said passageways substantially surrounding said chamber, and means for circulating a fluid through said passageways.

18. In combination with a machine tool having a portion provided with walls, a passageway defined by said walls, and positive means for circulating a fluid in said passageway to control the temperature of said walls to prevent distortion therein.

19. In a machine tool having a movable part, walls supporting said part, and means for preventing distortion in said walls by controlling the temperature thereof and including a positively driven element.

20. In a machine tool having spaced walls, a support arranged between said walls, and a bearing in said support, said walls being provided below said bearing support with slots whereby there will be substantially equal portions of the support above and below said bearing and expansion and contraction of said support under temperature changes will be substantially uniform.

21. In a machine tool having spaced walls, supports arranged between adjacent pairs of said walls, and bearings in said supports, said walls being provided at one side of said bearings with slots whereby there will be substantially equal portions of said supports on opposite sides of said bearings and the centers of said bearings will remain constant irrespective of the expansion and contraction of said supports due to temperature changes.

22. In a machine tool having a lubricant chamber, a passageway substantially embracing said chamber, a second passageway arranged at the front of said chamber and communicating with said first named passageway, and means for circulating a fluid in said passageways to control the temperature of the lubricant in said chamber.

23. In a machine tool having a lubricant chamber, a substantially U-shaped passageway extending along certain sides of said chamber, a second passageway located at another side of said chamber and communicating with said first named passageway, and means for circulating a fluid in said passageways to control the temperature of the lubricant in said chamber.

24. In a machine tool having a lubricant chamber, a substantially U-shaped passageway having its leg portions located at opposite sides of said chamber and its base portion located at another side thereof, said leg portions opening outwardly of the machine at one of their ends and said base portions also opening outwardly of the machine, a second passageway located at a side of said first named passageway and opening outwardly of the machine at one end and communicating with said first named passageway at its opposite end, and means for circulating a fluid in said passageways to control the temperature of the lubricant in said chamber.

25. In a machine tool having movable parts, bearings for said parts, walls defining passageways and a lubricant chamber, certain of said walls supporting said bearings, one of said passageways substantially embracing said chamber and another of said passageways being arranged at a side of said chamber and communicating with said last named passageway, and means for circulating a fluid in said passageways to control the temperature of said bearings and the lubricant in said chamber.

26. In a machine tool having a lubricant chamber, a passageway juxtaposed with respect to said chamber and including a portion opening outwardly of the machine, and means adjacent said portion for circulating fluid in said passageway.

27. In a machine tool having a rotatable part, a lubricant chamber, a passageway juxtaposed with respect to said chamber and including a portion opening outwardly of the machine, and means on said rotatable part and adjacent to said portion for circulating a fluid in said passageway.

28. In a machine tool having a rotatable part, a lubricant chamber, a passageway juxtaposed with respect to said chamber and including a portion opening outwardly of the machine, and a pulley on said part and adjacent to said portion and provided with fan-like elements for circulating fluid in said passageway.

29. In a machine tool having a rotatable part, a lubricant chamber, a passageway juxtaposed with respect to said chamber and including a portion opening outwardly of the machine, and a pulley on said part and adjacent to said portion and provided with means for circulating a fluid through said pulley and within said passageway.

30. In a machine tool, having a rotatable part, a lubricant chamber, a passageway juxtaposed with respect to said chamber and including a portion opening outwardly of the machine, a pulley on said part adjacent the said portion and having fan-like elements associated therewith to cause a circulation of fluid through said pulley and within said passageway, and means surrounding said elements for directing the flow of fluid.

31. In a machine tool having a rotatable part, a lubricant chamber, a passageway juxtaposed with respect to said chamber, a pulley on said part, and an independently rotatable fan housed within the pulley and arranged with respect to a portion of said passageway so that a circulation of fluid will be created therein upon rotation of said pulley.

32. In a machine tool having a rotatable part, a bearing for said part, a passageway surrounding said bearing, means for driving said part including a spoked pulley and a fan arranged co-axially with said pulley and rotatable independently thereof for circulating fluid in said passageway to control the temperature of said bearing.

33. In a machine tool having a rotatable part, a bearing for said part, a passageway surrounding said bearing, a pulley for rotating said part and carried thereby and forming a continuation of said passageway, and a fan freely rotatable on said part and arranged within said pulley.

34. In a machine tool, a rotatable part, a bearing for said part, a passageway surrounding said bearing, a pulley for rotating said part, and a fan located within said passageway and co-axially arranged with respect to said pulley to rotate independently thereof for creating a circulation of fluid in said passageway to control the temperature of said bearing.

35. In a machine tool, a rotatable part, a bearing for said part, a passageway surrounding said bearing, a spoked pulley carried by said part for rotating the same, and a fan carried by said part within said passageway and rotatable independently thereof for creating a circulation of fluid in said passageway to control the temperature of said bearing.

36. In a machine tool having a rotatable part, a bearing for said part, a passageway surrounding said bearing, a pulley for rotating said part and carried thereby, a fan freely rotatable on said part arranged adjacent to said pulley, and means for driving said pulley and fan at different speeds.

37. In a machine tool, in combination, a movable part, separate castings secured together and forming the support for a bearing for said part, said casting having cooperating portions forming a passageway surrounding said bearing support, and means for circulating a fluid in said passageway to control the temperature of said bearing.

38. In a machine tool, in combination, a movable part, separate castings secured together and provided with a support for a bearing for said part and with a chamber for lubricant for said bearing and part, said casting having cooperating portions forming a passageway surrounding said bearing support and substantially surrounding said chamber, and means for circulating a fluid to control the temperature of said bearing and said lubricant.

39. In a machine tool, in combination, a movable part, separate castings secured together, one of said castings forming a bearing support for said part, said castings having cooperating portions forming a passageway surrounding said bearing support, and means for circulating a fluid in said passageway to control the temperature of the bearing for said part.

40. In a machine tool, in combination, a movable part, separate castings secured together, one of said castings being provided with supports for the bearings and with a chamber for the lubricant for said part, said castings having cooperating portions forming a passageway surrounding said bearing supports and said chamber, and means for circulating a fluid to control the temperature of the bearings carried by said supports and of the lubricant within said chamber.

41. In a machine tool, in combination, separate castings secured together, a lubricant chamber, said castings having cooperating portions forming a passageway substantially surrounding said chamber, and means for circulating a fluid through said passageway to control the temperature of the lubricant in said chamber.

42. In a machine tool, in combination, separate castings secured together and having portions provided with walls, a passageway defined in part by the walls of one casting and in part by the walls of another casting, and means for circulating a fluid in said passageway to control the temperature of said walls to prevent distortion therein.

43. In a machine tool, a bed, a separate head thereon, ways on said bed beyond said head, said head comprising a portion resting upon and extending substantially the transverse width of the top of the bed and a portion extending downwardly along a side of the bed, said portions being secured to the bed.

EDWARD P. BURRELL.